US012073796B2

(12) United States Patent
Min et al.

(10) Patent No.: US 12,073,796 B2
(45) Date of Patent: Aug. 27, 2024

(54) DISPLAY DEVICE

(71) Applicant: LG Display Co., Ltd., Seoul (KR)

(72) Inventors: ByungSam Min, Goyang-si (KR); JaeHyung Jo, Goyang-si (KR); InYeong Kong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/979,578

(22) Filed: Nov. 2, 2022

(65) Prior Publication Data

US 2023/0215389 A1 Jul. 6, 2023

(30) Foreign Application Priority Data

Dec. 31, 2021 (KR) ........................ 10-2021-0194687

(51) Int. Cl.
*G09G 3/3291* (2016.01)
*G09G 3/3266* (2016.01)

(52) U.S. Cl.
CPC ......... *G09G 3/3291* (2013.01); *G09G 3/3266* (2013.01); *G09G 2300/0452* (2013.01); *G09G 2300/0842* (2013.01); *G09G 2310/0278* (2013.01); *G09G 2320/0233* (2013.01)

(58) Field of Classification Search
CPC ... G09G 2310/0235; G09G 2310/0297; G09G 2300/0452
See application file for complete search history.

(56) References Cited

U.S. PATENT DOCUMENTS 8,605,062 B2 12/2013 Kohno et al.
9,865,209 B2* 1/2018 Oh ........................ G09G 3/3648
10,074,306 B2* 9/2018 Kim ...................... G09G 3/3233
10,115,351 B2* 10/2018 Kim ...................... G09G 3/3291
2008/0252624 A1* 10/2008 Jang ...................... G09G 3/3648 345/204
2013/0278582 A1* 10/2013 Liao ........................ G02B 30/25 345/212
2014/0054624 A1* 2/2014 Chen ........................ G09G 3/20 257/89
2016/0351096 A1* 12/2016 Tani ...................... G09G 3/3233
2017/0124947 A1* 5/2017 Kim ...................... G09G 3/3233
2017/0294166 A1 10/2017 Kim
2018/0145121 A1* 5/2018 Park ...................... H10K 59/122
2018/0210304 A1* 7/2018 Wang .................... G09G 3/3688
2019/0066591 A1 2/2019 Xu et al.
(Continued)

FOREIGN PATENT DOCUMENTS

JP 2008224863 A 9/2008

*Primary Examiner* — Sepehr Azari
(74) *Attorney, Agent, or Firm* — Seed IP Law Group LLP

(57) ABSTRACT

A display device includes a display panel having a plurality of pixels. The device includes a data driver configured to supply a data voltage to the plurality of pixels via a plurality of data lines using a sensing result of the plurality of pixels via a first reference voltage line, a second reference voltage line, and a third reference line. The device includes a gate driver configured to supply a gate signal to the plurality of pixels via a plurality of gate lines. Each of the plurality of data lines is branched into a plurality of sub data lines and each of the plurality of sub data lines is connected to a plurality of sub pixels having the same color. The reference voltage lines are connected to the plurality of sub pixels. The device improves a sensing speed of the sub pixel.

16 Claims, 13 Drawing Sheets

(56) References Cited

U.S. PATENT DOCUMENTS

| | | | | |
|---|---|---|---|---|
| 2020/0160768 | A1* | 5/2020 | Wang | G09G 3/20 |
| 2020/0211486 | A1* | 7/2020 | Wang | G09G 3/3614 |
| 2021/0049971 | A1* | 2/2021 | Xiao | G06F 3/0412 |
| 2021/0202678 | A1 | 7/2021 | Yuan et al. | |

* cited by examiner

DISPLAY DEVICE

CROSS-REFERENCE TO RELATED APPLICATIONS

This application claims the priority of Korean Patent Application No. 10-2021-0194687 filed on Dec. 31, 2021, in the Korean Intellectual Property Office.

BACKGROUND

Technical Field

The present disclosure relates to a display device, and more particularly, to a display device which is capable of sensing a light emitting diode.

Description of the Related Art

In display devices which are used for a monitor of a computer, a television, or a cellular phone, there are organic light emitting display (OLED) devices which is a self-emitting device and a liquid crystal display (LCD) device which require separate light sources.

Among various display devices, an OLED device includes a display panel including a plurality of sub pixels and a driver which drives the display panel. The driver includes a gate driver configured to supply a gate signal to the display panel and a data driver configured to supply a data voltage. When a signal such as a gate signal and a data voltage is supplied to a sub pixel of the OLED device, the selected sub pixel emits light to display images.

BRIEF SUMMARY

A degree of the change in the characteristic values between circuit elements of a sub pixel may vary depending on a degree of degradation of each circuit element. Such a difference in the changing degree of the characteristic values between the circuit elements may cause a luminance deviation between the sub pixels. That is, the luminance deviation between the sub pixels may cause problems such as degradation of the accuracy of the luminance of the sub pixel, and/or may cause screen abnormalities.

One or more embodiments of the present disclosure provide a display device including a sensing transistor which senses a characteristic value of a sub pixel, or more accurately and efficiently senses a characteristic value of a sub pixel.

One or more embodiments of the present disclosure provide a display device which improves a sensing speed.

One or more embodiments of the present disclosure provide a display device which suppresses an unexpected or undesirable line pattern.

In order to achieve the above-described technical benefits, a display device according to an example embodiment of the present disclosure may reduce a sensing time of the plurality of sub pixels.

Objects of the present disclosure are not limited to the above-mentioned objects, and other objects, which are not mentioned above, can be clearly understood by those skilled in the art from the following descriptions.

According to an aspect of the present disclosure, a display device includes a display panel in which a plurality of pixels including a first sub pixel, a second sub pixel, and a third sub pixel each having a different color is disposed; a data driver configured to supply a data voltage to the plurality of pixels via a plurality of data lines using a sensing result of the plurality of pixels via a first reference voltage line, a second reference voltage line, and a third reference line; and a gate driver configured to supply a gate signal to the plurality of pixels via a plurality of gate lines, in which the plurality of first sub pixels is disposed in a 9k-8th column, a 9k-5th column, and a 9k-2th column, in which the plurality of second sub pixels is disposed in a 9k-7th column, a 9k-4th column, and a 9k-1st column, the plurality of third sub pixels is disposed in a 9k-6th column, a 9k-3rd column, and a 9k-th column, each of the plurality of data lines is branched into a plurality of sub data lines and each of the plurality of sub data lines is connected to a plurality of sub pixels having the same color, the first reference voltage line is connected to the plurality of first sub pixels disposed in the 9k-8th column, the plurality of second sub pixels disposed in the 9k-7th column, and the plurality of third sub pixels disposed in the 9k-6th column, the second reference voltage line is connected to the plurality of first sub pixels disposed in the 9k-5th column, the plurality of second sub pixels disposed in the 9k-4th column, and the plurality of third sub pixels disposed in the 9k-3th column, and the third reference voltage line is connected to the plurality of first sub pixels disposed in the 9k-2nd column, the plurality of second sub pixels disposed in the 9-1st column, and the plurality of third sub pixels disposed in the 9k-th column to improve a sensing speed of the sub pixel.

According to another feature of the present disclosure, with respect to one row, any one of the plurality of first sub pixels disposed in the 16k-15th column, any one of the plurality of second sub pixels disposed in the 16k-14th column, any one of the plurality of third sub pixels disposed in the 16k-13th column, and any one of the plurality of fourth sub pixels disposed in the 16k-12th column configure a first pixel, any one of the plurality of first sub pixels disposed in the 16k-11th column, any one of the plurality of second sub pixels disposed in the 16k-10th column, any one of the plurality of third sub pixels disposed in the 16k-9th column, and any one of the plurality of fourth sub pixels disposed in the 16k-8th column configure a second pixel, any one of the plurality of first sub pixels disposed in the 16k-7th column, any one of the plurality of second sub pixels disposed in the 16k-6th column, any one of the plurality of third sub pixels disposed in the 16k-5th column, and any one of the plurality of fourth sub pixels disposed in the 16k-4th column configure a third pixel, and any one of the plurality of first sub pixels disposed in the 16k-3rd column, any one of the plurality of second sub pixels disposed in the 16k-2nd column, any one of the plurality of third sub pixels disposed in the 16k-1st column, and any one of the plurality of fourth sub pixels disposed in the 16k-th column configure a fourth pixel, in each of the first pixel, the second pixel, the third pixel, and the fourth pixel, a first sub pixel, a second sub pixel, a third sub pixel, and a fourth sub pixel are connected to different gate lines, a plurality of first sub pixels included in the first pixel, the second pixel, the third pixel, and the fourth pixel is connected to different gate lines each other, a plurality of second sub pixels included in the first pixel, the second pixel, the third pixel, and the fourth pixel is connected to different gate lines each other, a plurality of third sub pixels included in the first pixel, the second pixel, the third pixel, and the fourth pixel is connected to different gate lines each other, and a plurality of fourth sub pixels included in the first pixel, the second pixel, the third pixel, and the fourth pixel is connected to different gate lines each other.

According to yet another feature of the present disclosure, a display device comprising a display panel in which a plurality of pixels including a first sub pixel, a second sub pixel, a third sub pixel, and a fourth sub pixel each having a different color is disposed, a data driver configured to supply a data voltage to the plurality of pixels via a plurality of data lines using a sensing result of the plurality of pixels via a first reference voltage line, a second reference voltage line, and a third reference line; and a gate driver configured to supply a gate signal to the plurality of pixels via a plurality of gate lines, wherein a plurality of first sub pixels is disposed in a 12k-11th column, a 12k-7th column, and a 12k-3th column, a plurality of second sub pixels is disposed in a 12k-10th column, a 12k-6th column, and a 12k-2nd column, a plurality of third sub pixels is disposed in a 12k-9th column, a 12k-5th column, and a 12k-1st column, and a plurality of fourth sub pixels is disposed in a 12k-8th column, a 12k-4th column, and a 12k-th column, each of the plurality of data lines is branched into a plurality of sub data lines, each of the plurality of sub data lines is connected to a plurality of sub pixels having the same color, the first reference voltage line is connected to the plurality of first sub pixels disposed in the 12k-11th column, the plurality of second sub pixels disposed in the 12k-10th column, the plurality of third sub pixels disposed in the 12k-9th column, and the plurality of fourth sub pixels disposed in the 12k-8th column, the second reference voltage line is connected to the plurality of first sub pixels disposed in the 12k-7th column, the plurality of second sub pixels disposed in the 12k-6th column, the plurality of third sub pixels disposed in the 12k-5th column, and the plurality of fourth sub pixels disposed in the 12k-4th column, and the third reference voltage line is connected to the plurality of first sub pixels disposed in the 12k-3rd column, the plurality of second sub pixels disposed in the 12k-2nd column, the plurality of third sub pixels disposed in the 12k-1st column, and the plurality of fourth sub pixels disposed in the 12k-th column (k is a natural number of 1 or larger).

Other matters of the example embodiments are set out by the detailed description and the drawings.

According to the present disclosure, a sub pixel with a different color is sensed during one scan timing to more precisely and/or accurately compensate for a data voltage.

According to the present disclosure, a plurality of sub pixels is sensed during one scan timing to more quickly sense all sub pixels.

According to the present disclosure, an order of applying a gate voltage varies for every frame to uniformly display an image.

The effects according to the present disclosure are not limited to the contents exemplified above, and more various effects are included in the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
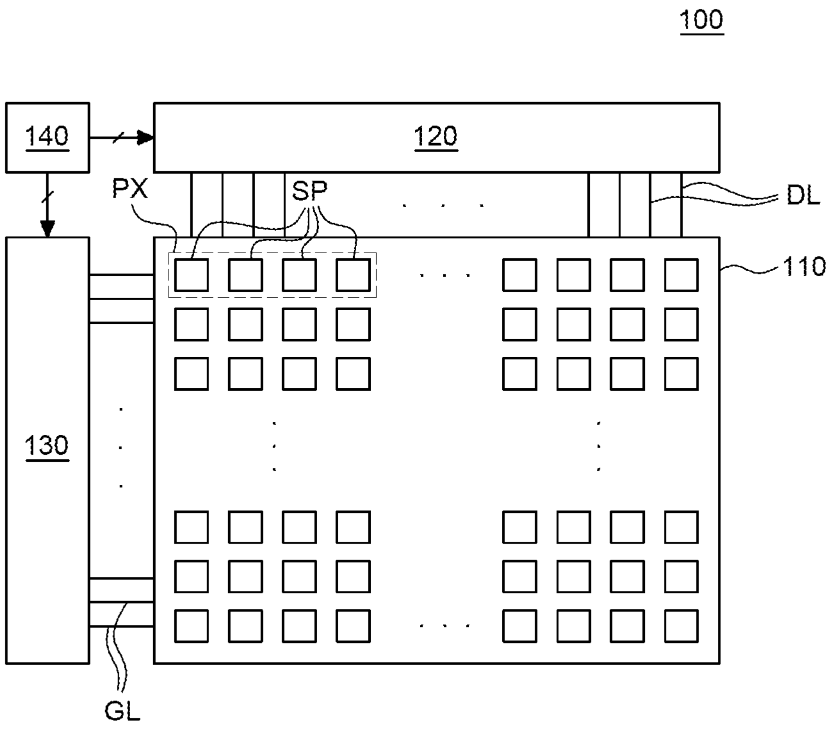
FIG. 1 is a schematic view of a display device according to an example embodiment of the present disclosure.

Advantages and characteristics of the present disclosure and a method of achieving the advantages and characteristics will be clear by referring to example embodiments described below in detail together with the accompanying drawings. However, the present disclosure is not limited to the example embodiments disclosed herein but can be implemented in various forms. The example embodiments are provided by way of example only so that those skilled in the art can fully understand the disclosures of the present disclosure and the scope of the present disclosure. Therefore, the present disclosure is by the scope of the appended claims.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term such as "immediately" or "directly."

When an element or layer is disposed "on" another element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The term "connected" as used herein is interpreted in the same manner as the term "coupled." In addition, the term "connected" also includes the meaning of "electrically connected."

The features of various embodiments of the present disclosure can be partially or entirely adhered to or combined with each other and can be interlocked and operated in technically various ways, and the embodiments can be carried out independently of or in association with each other.

A transistor used for a display device of the present disclosure may be implemented by one or more transistors among n-channel transistors (NMOS) and p-channel transistors (PMOS). The transistor may be implemented by an oxide semiconductor transistor having an oxide semiconductor as an active layer or a low temperature poly-silicon (LTPS) transistor having an LTPS as an active layer. The transistor may include at least a gate electrode, a source electrode, and a drain electrode. The transistor may be implemented as a thin film transistor on a display panel. In the transistor, carriers flow from the source electrode to the drain electrode. In the case of the n-channel transistor (NMOS), since the carriers are electrons, in order to allow the electrons to flow from the source electrode to the drain electrode, a source voltage is lower than a drain voltage. A direction of the current in the n-channel transistor NMOS flows from the drain electrode to the source electrode and the source electrode may serve as an output terminal. In the case of the p-channel transistor (PMOS), since the carriers are holes, in order to allow the holes to flow from the source electrode to the drain electrode, a source voltage is higher than a drain voltage. In the p-channel transistor PMOS, the holes flow from the source electrode to the drain electrode so that current flows from the source to the drain and the drain electrode serves as an output terminal. Accordingly, the source and the drain may be switched in accordance with the applied voltage so that it should be noted that the source and the drain of the transistor are not fixed. In the present disclosure, it is assumed that the transistor is an n-channel transistor NMOS, but is not limited thereto. Alternatively, the p-channel transistor may be used and thus a circuit configuration may be changed.

Gate signals of transistors which are used as switching elements swing between a gate-on voltage and a gate-off voltage. The gate-on voltage is set to be higher than a threshold voltage Vth of the transistor and the gate-off voltage is set to be lower than the threshold voltage Vth of the transistor. The transistor is turned on in response to the gate-on voltage and is turned off in response to the gate-off voltage. In the case of the NMOS, the gate-on voltage is a gate high voltage VGH and the gate-off voltage is a gate low voltage VGL. In the case of the PMOS, the gate-on voltage is a gate low voltage VGL and the gate-off voltage is a gate high voltage VGH.

Hereinafter, various example embodiments of the present disclosure will be described in detail with reference to accompanying drawings.

FIG. 1 is a schematic view of a display device according to an example embodiment of the present disclosure. Referring to FIG. 1, a display device 100 includes a display panel 110, a gate driver 120, a data driver 130, and a timing controller 140.

The display panel 110 is a panel for displaying images. The display panel 110 may include various circuits, wiring lines, and light emitting diodes disposed on the substrate. The display panel 110 is divided by a plurality of data lines DL and a plurality of gate lines GL intersecting each other and includes a plurality of pixels PX connected to the plurality of data lines DL and the plurality of gate lines GL. The display panel 110 includes a display area defined by a plurality of pixels PX and a non-display area in which various signal lines or pads are formed. The display panel 110 may be implemented by a display panel 110 used in various display devices such as an LCD device, an OLED device, or an electrophoretic display device. Hereinafter, it is described that the display panel 110 is a panel used in the OLED device, but is not limited thereto.

The timing controller 140 receives timing signals such as a vertical synchronization signal, a horizontal synchronization signal, a data enable signal, or a dot clock via a receiving circuit such as an LVDS or TMDS interface connected to a host system. The timing controller 140 generates timing control signals based on the input timing signal to control the data driver 130 and the gate driver 120.

The data driver 130 supplies a data voltage DATA to a plurality of sub pixels SP. The data driver 130 may include a plurality of source drive integrated circuits (ICs). The plurality of source drive ICs may be supplied with digital video data and a source timing control signal from the timing controller 140. The plurality of source drive ICs converts digital video data into a gamma voltage in response to the source timing control signal to generate a data voltage DATA and may supply the data voltage DATA through the data line DL of the display panel 110. The plurality of source drive ICs may be connected to the data line DL of the display panel 110 by a chip on glass (COG) process or a tape automated bonding (TAB) process. Further, the source drive ICs are formed on the display panel 110 or are formed on a separate PCB substrate to be connected to the display panel 110.

The gate driver 120 supplies a gate signal to the plurality of sub pixels SP. The gate driver 120 may include a level shifter and a shift register. The level shifter shifts a level of a clock signal input at a transistor-transistor-logic (TTL) level from the timing controller 140 and then supplies the shifted clock signal to the shift register. The shift register may be formed in the non-display area of the display panel 110, by a GIP manner, but is not limited thereto. The shift register is configured by a plurality of stages which shifts the gate signal to output, in response to the clock signal and the driving signal. The plurality of stages included in the shift register sequentially outputs the gate signal through a plurality of output terminals.

The display panel 110 may include a plurality of sub pixels SP. The plurality of sub pixels SP may be sub pixels for emitting different color light. For example, the plurality of sub pixels SP may be red sub pixels, green sub pixels, and blue sub pixels, but is not limited thereto so that the plurality of sub pixels SP may be red sub pixels, green sub pixels, blue sub pixels, and white sub pixels. The plurality of sub pixels SP may configure a pixel PX. That is, the red sub pixel, the green sub pixel, the blue sub pixel, and the white sub pixel may configure one pixel PX and the display panel 110 may include a plurality of pixels PX.

Hereinafter, a driving circuit for driving one sub pixel SP will be described in more detail with reference to FIG. 2 together.

Figure 2:
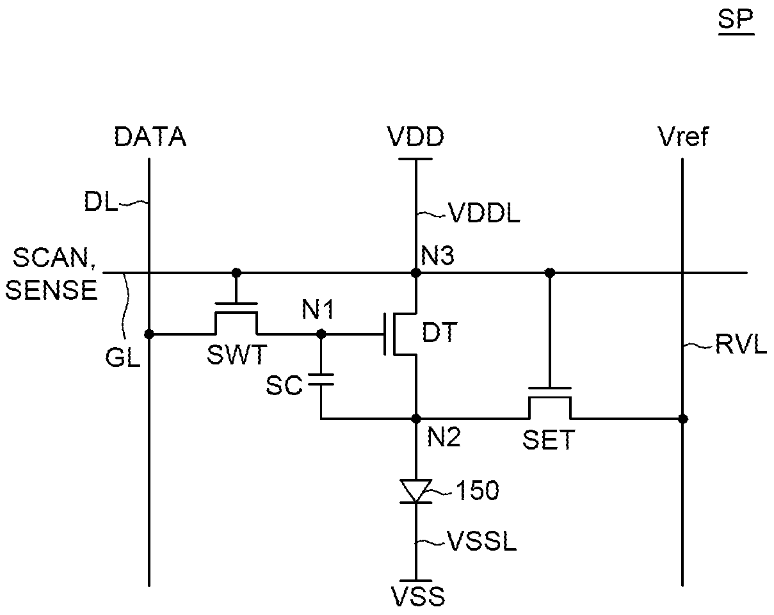
FIG. 2 is a circuit diagram of a sub pixel of a display device according to an example embodiment of the present disclosure.

FIG. 2 is a circuit diagram of a sub pixel of a display device according to an example embodiment of the present disclosure. In FIG. 2, a circuit diagram for one sub pixel SP among the plurality of sub pixels SP of the display device 100 is illustrated.

Referring to FIG. 2, the sub pixel SP may include a switching transistor SWT, a sensing transistor SET, a driving transistor DT, a storage capacitor SC, and a light emitting diode 150.

The light emitting diode 150 may include an anode, an organic layer, and a cathode. The organic layer may include various organic layers such as a hole injection layer, a hole transport layer, an organic light emitting layer, an electron transport layer, and an electron injection layer. The anode of the light emitting diode 150 may be connected to an output terminal of the driving transistor DT and a low potential voltage VSS may be applied to the cathode. Even though in FIG. 2, it is described that the light emitting diode 150 is an organic light emitting diode 150, the present disclosure is not limited thereto so that as the light emitting diode 150, an inorganic light emitting diode, that is, an LED may also be used.

Referring to FIG. 2, the switching transistor SWT is a transistor which transmits the data voltage DATA to a first node N1 corresponding to a gate electrode of the driving transistor DT. The switching transistor SWT may include a drain electrode connected to the data line DL, a gate electrode connected to the gate line GL, and a source electrode connected to the gate electrode of the driving transistor DT. The switching transistor SWT is turned on by a scan signal SCAN applied from the gate line GL to transmit a data voltage DATA supplied from the data line DL to the first node N1 corresponding to the gate electrode of the driving transistor DT.

Referring to FIG. 2, the driving transistor DT is a transistor configured to supply a driving current to the light emitting diode 150 to drive the light emitting diode 150. The driving transistor DT may include a gate electrode corresponding to the first node N1, a source electrode corresponding to a second node N2 and an output terminal, and a drain electrode corresponding to a third node N3 and an input terminal. The gate electrode of the driving transistor DT is connected to the switching transistor SWT, the drain electrode is applied with a high potential voltage VDD via a high potential voltage line VDDL, and the source electrode is connected to the anode of the light emitting diode 150.

Referring to FIG. 2, a storage capacitor SC is a capacitor which maintains a voltage corresponding to the data voltage DATA for one frame. One electrode of the storage capacitor SC is connected to the first node N1 and the other electrode is connected to the second node N2.

In the meantime, in the case of the display device 100, as the driving time of each sub pixel SP is increased, the circuit element such as the driving transistor DT may be degraded. Accordingly, a unique characteristic value of the circuit element such as a driving transistor DT may be changed. Here, the unique characteristic value of the circuit element may include a threshold voltage Vth of the driving transistor DT or a mobility a of the driving transistor DT. The change in the characteristic value of the circuit element may cause a luminance change of the corresponding sub pixel SP. Accordingly, the change in the characteristic value of the circuit element may be used as the same concept as the luminance change of the sub pixel SP.

Further, the degree of the change in the characteristic values between circuit elements of each sub pixel SP may vary depending on a degree of degradation of each circuit element. Such a difference in the degree of change in the characteristic values between the circuit elements may cause a luminance deviation between the sub pixels SP. Accordingly, the characteristic value deviation between circuit elements may be used as the same concept as the luminance deviation between the sub pixels SP. The change in the characteristic values of the circuit elements, that is, the luminance change of the sub pixel SP and the characteristic value deviation between the circuit elements, that is, the luminance deviation between the sub pixels SP may cause problems such as the lowering of the accuracy for luminance, or luminance "expressiveness" of the sub pixel SP or may cause screen abnormality.

Therefore, the sub pixel SP of the display device 100 according to an example embodiment of the present disclosure may provide a sensing function of sensing a characteristic value for the sub pixel SP and a compensating function of compensating for the characteristic value of the sub pixel SP using the sensing result.

Therefore, as illustrated in FIG. 2, the sub pixel SP may further include a sensing transistor SET to effectively control a voltage state of the source electrode of the driving transistor DT, in addition to the switching transistor SWT, the driving transistor DT, the storage capacitor SC, and the light emitting diode 150.

Referring to FIG. 2, the sensing transistor SET is connected between the source electrode of the driving transistor DT and the reference voltage line RVL configured to supply a reference voltage Vref and a gate electrode is connected to the gate line GL. Therefore, the sensing transistor SET is turned on by the sensing signal SENSE applied through the gate line GL to apply the reference voltage Vref which is supplied through the reference voltage line RVL to the source electrode of the driving transistor DT. Further, the sensing transistor SET may be utilized as one of voltage sensing paths for the source electrode of the driving transistor DT.

Referring to FIG. 2, the switching transistor SWT and the sensing transistor SET of the sub pixel SP may share one gate line GL. That is, the switching transistor SWT and the sensing transistor SET are connected to the same gate line GL to be applied with the same gate signal. However, for the convenience of description, a voltage which is applied to the gate electrode of the switching transistor SWT is referred to as a scan signal SCAN and a voltage which is applied to the gate electrode of the sensing transistor SET is referred to as a sensing signal SENSE. However, the scan signal SCAN and the sensing signal SENSE applied to one sub pixel SP are the same signals which are transmitted from the same gate line GL. Therefore, in FIG. 3, the scan signal SCAN and the sensing signal SENSE are defined as gate signals GATE1, GATE2, and GATE3 to be described.

However, the present disclosure is not limited thereto so that only the switching transistor SWT is connected to the gate line GL and the sensing transistor SET may be connected to a separate sensing line. Therefore, the scan signal SCAN is applied to the switching transistor SWT through the gate line GL and the sensing signal SENSE is applied to the sensing transistor SET through the sensing line.

Accordingly, the reference voltage Vref is applied to the source electrode of the driving transistor DT via the sensing transistor SET. Further, a voltage for sensing the threshold voltage Vth of the driving transistor DT or the mobility a of the driving transistor DT is detected by the reference voltage line RVL. Further, the data driver 130 may compensate for the data voltage DATA in accordance with a variation of the threshold voltage Vth of the driving transistor DT or the mobility a of the driving transistor DT.

Hereinafter, a "placement relationship," that is relative positioning, of the plurality of sub pixels will be described with reference to FIG. 3.

Figure 3:
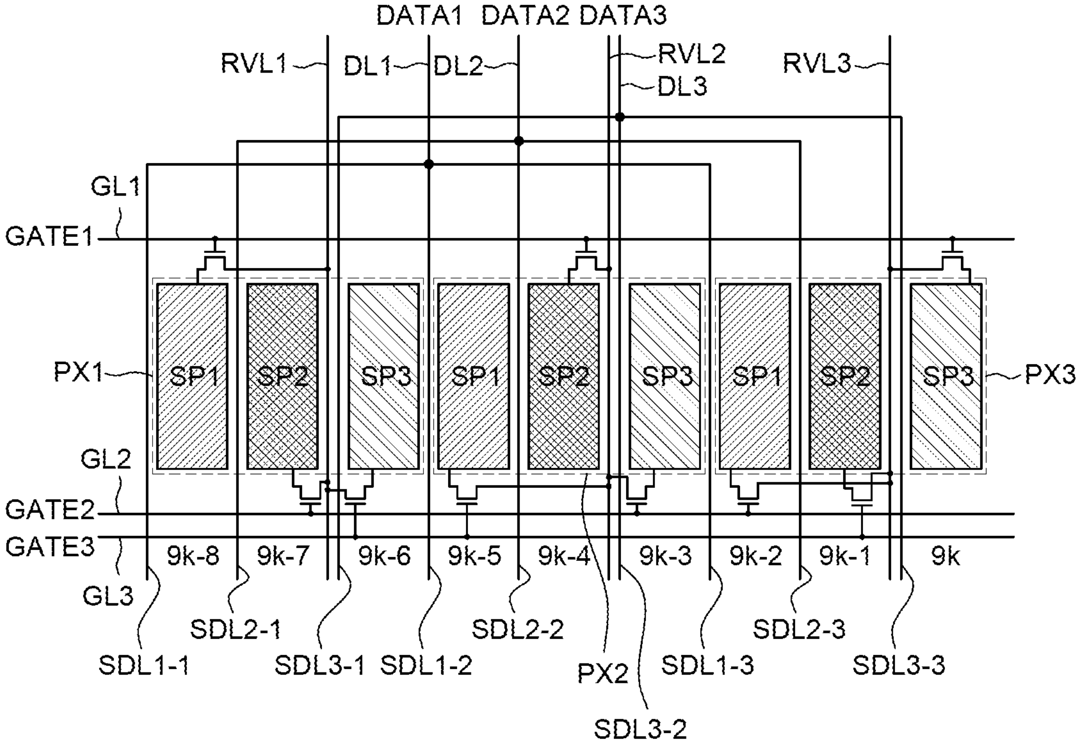
FIG. 3 is a block diagram for explaining a placement relationship of sub pixels of a display device according to an example embodiment of the present disclosure.

FIG. 3 is a block diagram for explaining a placement relationship of sub pixels of a display device according to an example embodiment of the present disclosure.

In FIG. 3, for the convenience of description, only three pixels PX which are disposed in one row are illustrated and in the display area, the placement relationship of the three pixels PX illustrated in FIG. 3 is repeated. Further, the transistor disposed between the sub pixels SP1, SP2, and SP3 and the gate line refers to the sensing transistor SET described with reference to FIG. 2.

Referring to FIG. 3, one pixel PX includes three sub pixels SP1, SP2, and SP3. For example, as illustrated in FIG. 3, the pixel PX may include a first sub pixel SP1, a second sub pixel SP2, and a third sub pixel SP3. Further, the first sub pixel SP1 is a red sub pixel, the second sub pixel SP2 is a green sub pixel, and the third sub pixel SP3 is a blue sub pixel. However, the present disclosure is not limited thereto and a plurality of sub pixels may be changed to various colors such as magenta, yellow, and cyan.

A plurality of same color sub pixels SP1, SP2, and SP3 may be disposed in the same column. That is, the plurality of first sub pixels SP1 is disposed in the same column, the plurality of second sub pixels SP2 is disposed in the same column, and the plurality of third sub pixels SP3 is disposed in the same column.

To be more specific, as illustrated in FIG. 3, the plurality of first sub pixels SP1 is disposed in a 9k-8th column, a 9k-5th column, and a 9k-2nd column. The plurality of second sub pixels SP2 is disposed in a 9k-7th column, a 9k-4th column, and a 9k-1st column. The plurality of third sub pixels SP3 is disposed in a 9k-6th column, a 9k-3rd column, and a 9k-th column. Here, k refers to a natural number of 1 or larger.

That is, the first sub pixel SP1, the second sub pixel SP2, and the third sub pixel SP3 are sequentially repeated with respect to one row.

As illustrated in FIG. 3, the first sub pixel SP1 disposed in the 9k-8th column, the second sub pixel SP2 disposed in the 9k-7th column, and the third sub pixel SP3 disposed in the 9k-6th column with respect to one row configure a first pixel PX1. The first sub pixel SP1 disposed in the 9k-5th column, the second sub pixel SP2 disposed in the 9k-4th column, and the third sub pixel SP3 disposed in the 9k-3rd column configure a second pixel PX2. The first sub pixel SP1 disposed in the 9k-2nd column, the second sub pixel SP2 disposed in the 9k-1st column, and the third sub pixel SP3 disposed in the 9k-th column configure a third pixel PX3.

Each of the plurality of data lines DL1, DL2, and DL3 may be branched into a plurality of sub data lines SDL1-1, SDL1-2, SDL1-3, SDL2-1, SDL2-2, SDL2-3, SDL3-1, SDL3-2, and SDL3-3. Specifically, the first data line DL1 is branched into a plurality of first sub data lines SDL1-1, SLD1-2, and SDL1-3, the second data line DL2 is branched into a plurality of second sub data lines SDL2-1, SLD2-2, and SDL2-3, and the third data line DL3 is branched into a plurality of third sub data lines SDL3-1, SDL3-2, and SDL3-3. As stated above, the first sub data lines SDL1-1, SLD1-2, and SDL1-3 may include a 1-1st sub data line SDL1-1, a 1-2nd sub data line SDL1-2, and a 1-3rd sub data line SDL1-3. The second sub data lines SDL2-1, and SLD2-2 may include a 2-1st sub data line SDL2-1, a 2-2nd sub data line SDL2-2, and a 2-3rd sub data line SDL2-3. The third sub data lines SDL3-1, SLD3-2, and SDL3-3 may include a 3-1st sub data line SDL3-1, a 3-2nd sub data line SDL3-2, and a 3-3rd sub data line SDL3-3.

A plurality of first sub data lines SDL1-1, SDL1-2, and SDL1-3 is disposed to be adjacent to the first sub pixels SP1 to be connected to the plurality of first sub pixels SP1.

Specifically, the 1-1st sub data lines SDL1-1 is disposed at one side of the plurality of first sub pixels SP1 disposed in the 9k-8th column to be electrically connected to the plurality of first sub pixels SP1 disposed in the 9k-8th column. The plurality of 1-2nd sub data lines SDL1-2 is disposed between a plurality of first sub pixels SP1 disposed in the 9k-5th column and a plurality of third sub pixels SP3 disposed in the 9k-5th column to be electrically connected to the plurality of first sub pixels SP1 disposed in the 9k-5th column. The plurality of 1-3rd sub data lines SDL1-3 is disposed between a plurality of first sub pixels SP1 disposed in the 9k-2nd column and a plurality of third sub pixels SP3 disposed in the 9k-2nd column to be electrically connected to the plurality of first sub pixels SP1 disposed in the 9k-2nd column.

A plurality of second sub data lines SDL2-1, SDL2-2, and SDL2-3 is disposed to be adjacent to the plurality of second sub pixels SP2 to be connected to the plurality of second sub pixels SP2. A plurality of third sub data lines SDL3-1, SDL3-2, and SDL3-3 is disposed to be adjacent to the plurality of third sub pixels SP3 to be connected to the plurality of third sub pixels SP3.

The placement structures of the plurality of second sub data lines SDL2-1, SDL2-2, and SDL2-3 and the plurality of third sub data lines SDL3-1, SDL3-2, and SDL3-3 may be repeated like the placement structure of the first sub data lines SDL1-1, SDL1-2, and SDL1-3.

A first data voltage DATA1 which is a red data voltage may be applied to the first data line DL1, a second data voltage DATA2 which is a green data voltage may be applied to the second data line DL2, and a third data voltage DATA3 which is a blue data voltage may be applied to the third data line DL3.

Therefore, the first data voltage DATA1 which is a red data voltage may be applied to the plurality of first sub data lines SDL1-1, SDL1-2, and SDL1-3, and the second data voltage DATA2 which is a green data voltage may be applied to the plurality of second sub data lines SDL2-1, SDL2-2, and SDL2-3. Further, the third data voltage DATA3 which is a blue data voltage may be applied to the plurality of third sub data lines SDL3-1, SDL3-2, and SDL3-3.

The plurality of gate lines GL1 to GL3 may be disposed on both sides of the plurality of sub pixels SP1, SP2, and SP3, respectively.

Specifically, referring to FIG. 3, the first gate line GL1 is disposed at one side of the plurality of sub pixels SP1, SP2, and SP3, and the second gate line GL2 and the third gate line GL3 may be disposed at the other side of the plurality of sub pixels SP1, SP2, and SP3. To be general, the first gate line GL1 which is a 3m-2nd gate line is disposed at one side of the plurality of sub pixels SP1, SP2, and SP3, and the second gate line GL2 which is a 3m-1st gate line and the third gate line GL3 which is a 3m-th gate line may be disposed at the other side of the plurality of sub pixels SP1, SP2, and SP3. Here, m is a natural number of 1 or larger.

In the meantime, from each pixels PX1, PX2, and PX3, the first sub pixel SP1, the second sub pixel SP2, and the third sub pixel SP3 may be connected to different gate lines GL1 to GL3 each other.

In one row, the first sub pixels SP1 of the plurality of pixels PX1, PX2, and PX3 are connected to different gate lines GL1 to GL3 each other, the second sub pixels SP2 of the plurality of pixels PX1, PX2, and PX3 are connected to different gate lines GL1 to GL3 each other, and the third sub pixels SP3 of the plurality of pixels PX1, PX2, and PX3 are connected to different gate lines GL1 to GL3 each other.

For example, referring to FIG. 3, the first gate line GL1 which is a 3m-2nd gate line is connected to the first sub pixel SP1 which is any one of the sub pixels of the first pixel PX1. The first gate line GL1 which is a 3m-2nd gate line is connected to a second sub pixel SP2, among the sub pixels of the second pixel PX2, which is a sub pixel having a different color from the first sub pixel SP1 of the first pixel PX1 connected to the first gate line GL1. Further, the first gate line GL1 which is a 3m-2nd gate line is connected to a third sub pixel SP3, among the sub pixels of the third pixel PX3, which is a sub pixel having a different color from the first sub pixel SP1 of the first pixel PX1 connected to the first gate line GL1 and the second sub pixel SP2 of the second pixel PX2 connected to the first gate line GL1.

The second gate line GL2 which is a 3m-1st gate line is connected to the second sub pixel SP2 which is the other one of the sub pixels of the first pixel PX1. The second gate line GL2 which is a 3m-1st gate line is connected to a third sub pixel SP3, among the sub pixels of the second pixel PX2, which is a sub pixel having a different color from the second sub pixel SP2 of the first pixel PX1 connected to the second gate line GL2. Further, the second gate line GL2 which is a 3m-1 st gate line is connected to a first sub pixel SP1, among the sub pixels of the third pixel PX3, which is a sub pixel having a different color from the second sub pixel SP2 of the first pixel PX1 connected to the second gate line GL2 and the third sub pixel SP3 of the second pixel PX2 connected to the second gate line GL2.

The third gate line GL3 which is a 3m-th gate line is connected to the third sub pixel SP3 which is another one of the sub pixels of the first pixel PX1. The third gate line GL3 which is a 3m-th gate line is connected to a first sub pixel SP1, among the sub pixels of the second pixel PX2, which is a sub pixel having a different color from the third sub pixel SP3 of the first pixel PX1 connected to the third gate line GL3. Further, the third gate line GL3 which is a 3m-th gate line is connected to a second sub pixel SP2, among the sub pixels of the third pixel PX3, which is a sub pixel having a different color from the third sub pixel SP3 of the first pixel PX1 connected to the third gate line GL3 and the first sub pixel SP1 of the second pixel PX2 connected to the third gate line GL3.

Each of the plurality of reference voltage lines RVL1, RVL2, and RVL3 may be disposed in one pixel PX1, PX2, and PX3.

That is, the first reference voltage line RVL1 is disposed inside the first pixel PX1, the second reference voltage line RVL2 is disposed inside the second pixel PX2, and the third reference voltage line RVL3 is disposed inside the third pixel PX3.

Specifically, the first reference voltage line RVL1 is disposed between the plurality of second sub pixels SP2 disposed in the 9k-7th column and the plurality of third sub pixels SP3 disposed in the 9k-6th column. Therefore, the plurality of first sub pixels SP1 disposed in the 9k-8th column, the plurality of second sub pixels SP2 disposed in the 9k-6th column, and the plurality of third sub pixels SP3 disposed in the 9k-6th column may be connected to the first reference voltage line RVL1.

The second reference voltage line RVL2 is disposed between the plurality of second sub pixels SP2 disposed in the 9k-4th column and the plurality of third sub pixels SP3 disposed in the 9k-3rd column. Therefore, the plurality of first sub pixels SP1 disposed in the 9k-5th column, the plurality of second sub pixels SP2 disposed in the 9k-4th column, and the plurality of third sub pixels SP3 disposed in the 9k-3rd column may be connected to the second reference voltage line RVL2.

The third reference voltage line RVL3 is disposed between the plurality of second sub pixels SP2 disposed in the 9k-1st column and the plurality of third sub pixels SP3 disposed in the 9k-th column. Therefore, the plurality of first sub pixels SP1 disposed in the 9k-2nd column, the plurality of second sub pixels SP2 disposed in the 9k-1st column, and the plurality of third sub pixels SP3 disposed in the 9k-3th column may be connected to the third reference voltage line RVL3.

Hereinafter, a sensing method of a display device according to an example embodiment of the present disclosure will be described with reference to FIG. 4.

Figure 4:
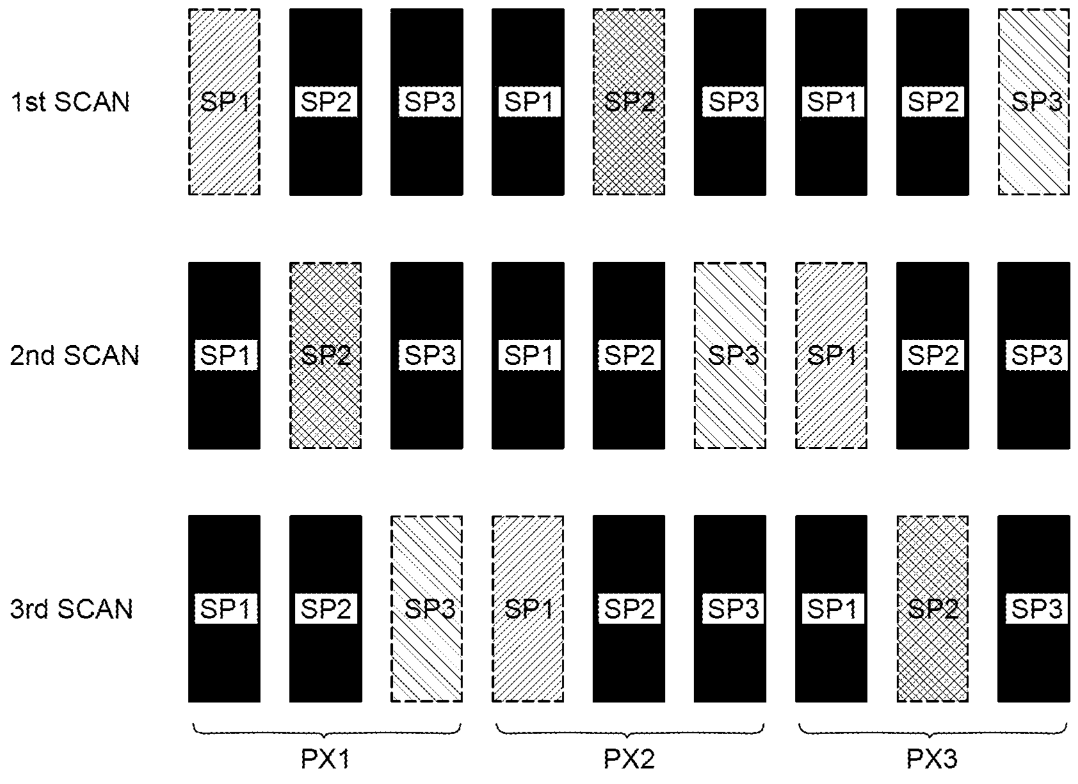
FIG. 4 is a view for explaining a sensing method of a display device according to an example embodiment of the present disclosure.

FIG. 4 is a view for explaining a sensing method of a display device according to an example embodiment of the present disclosure.

In FIG. 4, a sensing order of the plurality of sub pixels SP1, SP2, and SP3 illustrated in FIG. 2 is illustrated.

In FIG. 4, a state of the plurality of sub pixels disposed in one row, in each of a first scan period 1st SCAN in which a gate high voltage is applied to the first gate line GL1 which is the 3m-2nd gate line, a second scan period 2nd SCAN in which a gate high voltage is applied to the second gate line GL2 which is the 3m-1st gate line, and a third scan period 3rd SCAN in which a gate high voltage is applied to the third gate line GL3 which is the 3m-th gate line is illustrated. The first scan period 1st SCAN, the second scan period 2nd SCAN, and the third scan period 3rd SCAN refer to time periods which are sequentially connected.

The sub pixels SP1, SP2, and SP3 illustrated with the dotted lines refer to sub pixels SP1, SP2, and SP3 in which the sensing is performed in the corresponding scan period and sub pixels SP1, SP2, and SP3 having a black pattern refer to sub pixels SP1, SP2, and SP3 in which the sensing is not performed in the corresponding scan period.

Referring to FIGS. 3 and 4, in the first scan period 1st SCAN, the first gate voltage GATE1 is a gate high voltage so that the switching transistor SWT and the sensing transistor SET in the plurality of sub pixels SP1, SP2, and SP3 connected to the first gate line GL1 are turned on. Further, the plurality of sub pixels SP1, SP2, and SP3 connected to the first gate line GL1 is sensed by each of the plurality of reference voltage lines RVL1, RVL2, and RVL3.

For example, in the first scan period 1st SCAN, the first sub pixel SP1, which is any one of the sub pixels of the first pixel PX1 is sensed by the first reference voltage line RVL1. The second sub pixel SP2 which is a sub pixel having a different color from the first sub pixel SP1 of the first pixel PX1 connected to the first gate line GL1, among sub pixels of the second pixel PX2, is sensed by the second reference voltage line RVL2. The third sub pixel SP3 which is a sub pixel having a different color from the first sub pixel SP1 of the first pixel PX1 connected to the first gate line GL1 and the second sub pixel SP2 of the second pixel PX2 connected to the first gate line GL1, among sub pixels of the third pixel PX3, is sensed by the third reference voltage line RVL3.

In a subsequent second scan period 2nd SCAN, the second gate voltage GATE2 is a gate high voltage so that the switching transistor SWT and the sensing transistor SET in the plurality of sub pixels SP1, SP2, and SP3 connected to the second gate line GL2 are turned on. Further, the plurality of sub pixels SP1, SP2, and SP3 connected to the second gate line GL2 is sensed by each of the plurality of reference voltage lines RVL1, RVL2, and RVL3.

For example, in the second scan period 2nd SCAN, the second sub pixel SP2, which is the other one of the sub pixels of the first pixel PX1, is sensed by the first reference voltage line RVL1. The third sub pixel SP3 which is a sub pixel having a different color from the second sub pixel SP2 of the first pixel PX1 connected to the second gate line GL2, among sub pixels of the second pixel PX2, is sensed by the second reference voltage line RVL2. The first sub pixel SP1 which is a sub pixel having a different color from the second sub pixel SP2 of the first pixel PX1 connected to the second gate line GL2 and the third sub pixel SP3 of the second pixel PX2 connected to the second gate line GL2, among sub pixels of the third pixel PX3, is sensed by the third reference voltage line RVL3.

In a subsequent third scan period 3rd SCAN, the third gate voltage GATE3 is a gate high voltage so that the switching transistor SWT and the sensing transistor SET in the plurality of sub pixels SP1, SP2, and SP3 connected to the third gate line GL3 are turned on. Further, the plurality of sub pixels SP1, SP2, and SP3 connected to the third gate line GL3 is sensed by each of the plurality of reference voltage lines RVL1, RVL2, and RVL3.

For example, in the third scan period 3rd SCAN, the third sub pixel SP3, which is another one of the sub pixels of the first pixel PX1 is sensed by the first reference voltage line RVL1. The first sub pixel SP1 which is a sub pixel having a different color from the third sub pixel SP3 of the first pixel PX1 connected to the third gate line GL1, among sub pixels of the second pixel PX2, is sensed by the second reference voltage line RVL2. The second sub pixel SP2 which is a sub pixel having a different color from the third sub pixel SP3 of the first pixel PX1 connected to the third gate line GL3 and the first sub pixel SP1 of the second pixel PX2 connected to the third gate line GL3, among sub pixels of the third pixel PX3, is sensed by the third reference voltage line RVL3.

As described above, during one scan period among a plurality of scan periods, sub pixels SP1, SP2, and SP3 having different colors each other may be sensed.

In the display device of other art, in one scan period, only one sub pixel among a plurality of sub pixels disposed in a 9k-8th column to a 9k-th column is sensed so that nine scan periods are necessary to sense all the plurality of sub pixels disposed in the 9k-8th column to 9k-th column.

In contrast, in the display device according to an example embodiment of the present disclosure, in one scan period, three sub pixels among a plurality of sub pixels SP1, SP2, and SP3 disposed in a 9k-8th column to a 9k-th column are sensed. Therefore, only three scan periods are necessary to sense all the plurality of sub pixels SP1, SP2, and SP3 disposed in a 9k-8th column to a 9k-th column. Accordingly, the display device according to an example embodiment of the present disclosure may more quickly and accurately sense the plurality of sub pixels.

Figure 5:
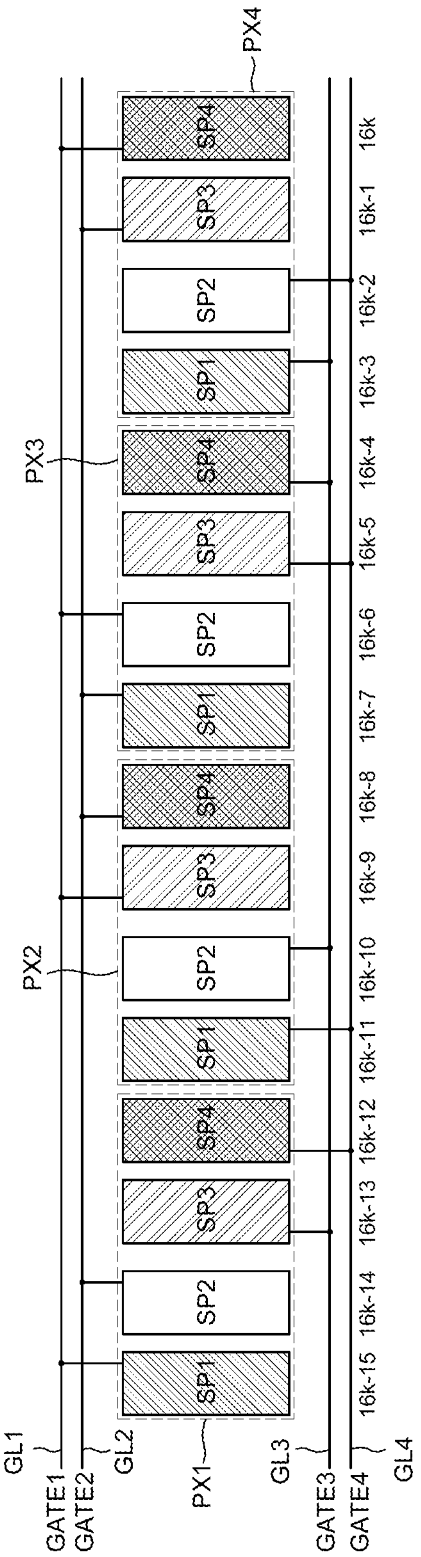
FIG. 5 is a block diagram for explaining a placement relationship of sub pixels of a display device according to another example embodiment of the present disclosure.

FIG. 5 is a block diagram for explaining a placement relationship of sub pixels of a display device according to another example embodiment of the present disclosure.

In FIG. 5, for the convenience of description, only four pixels PX which are disposed in one row are illustrated and in the display area, the placement relationship of four pixels PX illustrated in FIG. 5 is repeated. Further, the transistor disposed between the sub pixels SP1, SP2, SP3, and SP4 and the gate line refers to the sensing transistor SET described with reference to FIG. 2.

Referring to FIG. 5, one pixel PX includes four sub pixels SP1, SP2, SP3, and SP4. For example, as illustrated in FIG. 5, the pixel PX may include a first sub pixel SP1, a second sub pixel SP2, a third sub pixel SP3, and a fourth sub pixel SP4. Further, the first sub pixel SP1 is a red sub pixel, the second sub pixel SP2 is a white sub pixel, the third sub pixel SP3 is a blue sub pixel, and the fourth sub pixel SP4 is a green sub pixel. However, the present disclosure is not limited thereto and the plurality of sub pixels may be changed to various colors such as magenta, yellow, and cyan.

The plurality of same color sub pixels SP1, SP2, SP3, and SP4 may be disposed in the same column. That is, the plurality of first sub pixels SP1 is disposed in the same column, the plurality of second sub pixels SP2 is disposed in the same column, the plurality of third sub pixels SP3 is disposed in the same column, and the plurality of fourth sub pixels SP4 is disposed in the same column.

To be more specific, as illustrated in FIG. 5, the plurality of first sub pixels SP1 is disposed in a 16k-15th column, a 16k-11th column, a 16k-7th column, and a 16k-3rd column and the plurality of second sub pixels SP2 is disposed in a 16k-14th column, a 16k-10th column, a 16k-6th column, and a 16k-2nd column. The plurality of third sub pixels SP3 is disposed in a 16k-13th column, a 16k-9th column, a 16k-5th column, and a 16k-1st column and the plurality of fourth sub pixels SP4 is disposed in a 16k-12th column, a 16k-8th column, a 16k-4th column, and a 16k-th column. Here, k refers to a natural number of 1 or larger.

That is, the first sub pixel SP1, the second sub pixel SP2, the third sub pixel SP3, and the fourth sub pixel SP4 are sequentially repeated with respect to one row.

As illustrated in FIG. 5, the first sub pixel SP1 disposed in the 16k-15th column, the second sub pixel SP2 disposed in the 16k-14th column, the third sub pixel SP3 disposed in the 16k-13th column, and the fourth sub pixel SP4 disposed in the 16k-12th with respect to one row configure the first pixel PX1. The first sub pixel SP1 disposed in the 16k-11th column, the second sub pixel SP2 disposed in the 16k-10th column, the third sub pixel SP3 disposed in the 16k-9th column, and the fourth sub pixel SP4 disposed in the 16k-8th with respect to one row configure the second pixel PX2. The first sub pixel SP1 disposed in the 16k-7th column, the second sub pixel SP2 disposed in the 16k-6th column, the third sub pixel SP3 disposed in the 16k-5th column, and the fourth sub pixel SP4 disposed in the 16k-4th with respect to one row configure the third pixel PX3. The first sub pixel SP1 disposed in the 16k-3rd column, the second sub pixel SP2 disposed in the 16k-2nd column, the third sub pixel SP3 disposed in the 16k-1st column, and the fourth sub pixel SP4 disposed in the 16k-th with respect to one row configure the fourth pixel PX4.

Each of the plurality of data lines DL1, DL2, DL3, and DL4 may be divided into the plurality of sub data lines SDL1-1, SDL1-2, SDL1-3, SDL1-4, SDL2-1, SDL2-2, SDL2-3, SDL2-4, SDL3-1, SDL3-2, SDL3-3, SDL3-4, SDL4-1, SDL4-2, SDL4-3, and SDL4-4. Specifically, the first data line DL1 may be branched into a plurality of first sub data lines SDL1-1, SDL1-2, SDL1-3, and SDL1-4 and the second data line DL2 may be branched into a plurality of second sub data lines SDL2-1, SDL2-2, SDL2-3, and SDL2-4. Further, the third data line DL3 may be branched into a plurality of third sub data lines SDL3-1, SDL3-2, SDL3-3, and SDL3-4 and the fourth data line DL4 may be branched into a plurality of fourth sub data lines SDL4-1, SDL4-2, SDL4-3, and SDL4-4.

The first sub data lines SDL1-1, SDL1-2, SDL1-3, and SDL1-4 may include a 1-1st sub data line SDL1-1, a 1-2nd sub data line SDL1-2, a 1-3rd sub data line SDL1-3, and a 1-4th sub data line SDL1-4. The second sub data lines SDL2-1, SDL2-2, SDL2-3, and SDL2-4 may include a 2-1st sub data line SDL2-1, a 2-2nd sub data line SDL2-2, a 2-3rd sub data line SDL2-3, and a 2-4th sub data line SDL2-4. The third sub data lines SDL3-1, SDL3-2, SDL3-3, and SDL3-4 may include a 3-1st sub data line SDL3-1, a 3-2nd sub data line SDL3-2, a 3-3rd sub data line SDL3-3, and a 3-4th sub data line SDL3-4. The fourth sub data lines SDL4-1, SDL4-2, SDL4-3, and SDL4-4 may include a 4-1st sub data line SDL4-1, a 4-2nd sub data line SDL4-2, a 4-3rd sub data line SDL4-3, and a 4-4th sub data line SDL4-4.

The plurality of first sub data lines SDL1-1, SDL1-2, SDL1-3, and SDL1-4 is disposed to be adjacent to the plurality of first sub pixels SP1 to be connected to the plurality of first sub pixels SP1.

The plurality of second sub data lines SDL2-1, SDL2-2, SDL2-3, and SDL2-4 is disposed to be adjacent to the plurality of second sub pixels SP2 to be connected to the plurality of second sub pixels SP2.

The plurality of third sub data lines SDL3-1, SDL3-2, SDL3-3, and SDL3-4 is disposed to be adjacent to the plurality of third sub pixels SP3 to be connected to the plurality of third sub pixels SP3.

The plurality of fourth sub data lines SDL4-1, SDL4-2, SDL4-3, and SDL4-4 is disposed to be adjacent to the plurality of fourth sub pixels SP4 to be connected to the plurality of fourth sub pixels SP4.

The placement structures of the plurality of second sub data lines SDL2-1, SDL2-2, SDL2-3, and SDL2-4, the plurality of third sub data lines SDL3-1, SDL3-2, SDL3-3, and SDL3-4, and the plurality of fourth sub data lines SDL4-1, SDL4-2, SDL4-3, and SDL4-4 may be repeated like the placement structure of the plurality of first sub data lines SDL1-1, SDL1-2, SDL1-3, and SDL1-4.

A first data voltage DATA1 which is a red data voltage may be applied to the first data line DL1 and a second data voltage DATA2 which is a white data voltage may be applied to the second data line DL2. Further, a third data voltage DATA3 which is a blue data voltage may be applied to the third data line DL3 and a fourth data voltage DATA4 which is a green data voltage may be applied to the fourth data line DL4.

Therefore, the first data voltage DATA1 which is a red data voltage may be applied to the plurality of first sub data lines SDL1-1, SDL1-2, SDL1-3, and SDL1-4 and the second data voltage DATA2 which is a white data voltage may be applied to the plurality of second sub data lines SDL2-1, SDL2-2, SDL2-3, and SDL2-4. Further, the third data voltage DATA3 which is a blue data voltage may be applied to the plurality of third sub data lines SDL3-1, SDL3-2, SDL3-3, and SDL3-4 and the fourth data voltage DATA4 which is a green data voltage may be applied to the plurality of fourth sub data lines SDL4-1, SDL4-2, SDL4-3, and SDL4-4.

Each of the plurality of gate lines GATE1 to GATE4 may be disposed on both sides of the plurality of sub pixels SP1, SP2, SP3, and SP4.

Specifically, referring to FIG. 5, the first gate line GL1 and the second gate line are disposed at one side of the plurality of sub pixels SP1, SP2, SP3, and SP4 and the third gate line GL3 and the fourth gate line GL4 may be disposed at the other side of the plurality of sub pixels SP1, SP2, SP3, and SP4. To be general, the first gate line GL1 which is a 4m-3rd gate line and the second gate line GL2 which is a 4m-2nd gate line are disposed at one side of the plurality of sub pixels SP1, SP2, SP3, and SP4. The third gate line GL3 which is a 4m-1st gate line and the fourth gate line GL4 which is a 4m-th gate line may be disposed at the other side of the plurality of sub pixels SP1, SP2, SP3, and SP4. Here, m is a natural number of 1 or larger.

In the meantime, in each pixel PX1, PX2, PX3, and SP4, the first sub pixel SP1, the second sub pixel SP2, the third sub pixel SP3, and the fourth sub pixel SP4 may be connected to different gate lines GL1 to GL4 each other.

In one row, first sub pixels SP1 of the plurality of pixels PX1, PX2, PX3, and PX4 are connected to different gate lines GL1 to GL4 and second sub pixels SP2 of the plurality of pixels PX1, PX2, PX3, and PX4 are connected to different gate lines GL1 to GL4. Third sub pixels SP3 of the plurality of pixels PX1, PX2, PX3, and PX4 are connected to different gate lines GL1 to GL4 and fourth sub pixels SP4 of the plurality of pixels PX1, PX2, PX3, and PX4 are connected to different gate lines GL1 to GL4.

For example, referring to FIG. 5, the first gate line GL1 which is a 4m-3rd gate line is connected to the first sub pixel SP1 which is any one of sub pixels of the first pixel PX1 and is connected to the third sub pixel SP3 which is a sub pixel having a different color from the first sub pixel SP1 of the first pixel PX1 connected to the first gate line GL1, among sub pixels of the second pixel PX2. The first gate line GL1 which is a 4m-3rd gate line is connected to the second sub pixel SP2 which is a sub pixel having a different color from the first sub pixel SP1 of the first pixel PX1 connected to the first gate line GL1 and the third sub pixel SP3 of the second pixel PX2 connected to the first gate line GL1, among the sub pixels of the third pixel PX3. Further, the first gate line GL1 which is a 4m-3rd gate line is connected to the fourth sub pixel SP4 which is a sub pixel having a different color from the first sub pixel SP1 of the first pixel PX1 connected to the first gate line GL1, the third sub pixel SP3 of the second pixel PX2 connected to the first gate line GL1, and the second sub pixel SP2 of the third pixel PX3 connected to the first gate line GL1, among sub pixels of the fourth pixel PX4.

The second gate line GL2 which is a 4m-2nd gate line is connected to the second sub pixel SP2 which is the other one of sub pixels of the first pixel PX1 and is connected to the fourth sub pixel SP4 which is a sub pixel having a different color from the second sub pixel SP2 of the first pixel PX1 connected to the second gate line GL2, among sub pixels of the second pixel PX2. The second gate line GL2 which is a 4m-2nd gate line is connected to the first sub pixel SP1 which is a sub pixel having a different color from the second sub pixel SP2 of the first pixel PX1 connected to the second gate line GL2 and the fourth sub pixel SP4 of the second pixel PX2 connected to the second gate line GL2, among the sub pixels of the third pixel PX3. Further, the second gate line GL2 which is a 4m-2nd gate line is connected to the third sub pixel SP3 which is a sub pixel having a different color from the second sub pixel SP2 of the first pixel PX1 connected to the second gate line GL2, the fourth sub pixel SP4 of the second pixel PX2 connected to the second gate line GL2, and the first sub pixel SP1 of the third pixel PX3 connected to the second gate line GL2, among sub pixels of the fourth pixel PX4.

The third gate line GL3 which is a 4m-1st gate line is connected to the third sub pixel SP3 which is another one of sub pixels of the first pixel PX1 and is connected to the second sub pixel SP2 which is a sub pixel having a different color from the third sub pixel SP3 of the first pixel PX1 connected to the third gate line GL2, among sub pixels of the second pixel PX2. The third gate line GL3 which is a 4m-1st gate line is connected to the fourth sub pixel SP4 which is a sub pixel having a different color from the third sub pixel SP3 of the first pixel PX1 connected to the third gate line GL3 and the second sub pixel SP2 of the second pixel PX2 connected to the third gate line GL3, among the sub pixels of the third pixel PX3. Further, the third gate line GL3 which is a 4m-1st gate line is connected to the first sub pixel SP1 which is a sub pixel having a different color from the third sub pixel SP3 of the first pixel PX1 connected to the third gate line GL3, the second sub pixel SP2 of the second pixel PX2 connected to the third gate line GL3, and the fourth sub pixel SP4 of the third pixel PX3 connected to the third gate line GL3, among sub pixels of the fourth pixel PX4.

The fourth gate line GL4 which is a 4m-th gate line is connected to the fourth sub pixel SP4 which is the remaining one of sub pixels of the first pixel PX1 and is connected to the first sub pixel SP1 which is a sub pixel having a different color from the fourth sub pixel SP4 of the first pixel PX1 connected to the fourth gate line GL4, among sub pixels of the second pixel PX2. The fourth gate line GL4 which is a 4m-th gate line is connected to the third sub pixel SP3 which is a sub pixel having a different color from the fourth sub pixel SP4 of the first pixel PX1 connected to the fourth gate line GL4 and the first sub pixel SP1 of the second pixel PX2 connected to the fourth gate line GL4, among the sub pixels of the third pixel PX3. Further, the fourth gate line GL4 which is a 4m-th gate line is connected to the second sub pixel SP2 which is a sub pixel having a different color from the fourth sub pixel SP4 of the first pixel PX1 connected to the fourth gate line GL4, the first sub pixel SP1 of the second pixel PX2 connected to the fourth gate line GL4, and the third sub pixel SP3 of the third pixel PX3 connected to the fourth gate line GL4, among sub pixels of the fourth pixel PX4.

Each of the plurality of reference voltage lines RVL1, RVL2, RVL3, and RVL4 may be disposed in one pixel PX1, PX2, PX3, and PX4.

That is, the first reference voltage line RVL1 is disposed inside the first pixel PX1, the second reference voltage line RVL2 is disposed inside the second pixel PX2, the third reference voltage line RVL3 is disposed inside the third pixel PX3, and the fourth reference voltage line RVL4 is disposed inside the fourth pixel PX4.

Specifically, the first reference voltage line RVL1 is disposed between the plurality of second sub pixels SP2 disposed in the 16k-14th column and the plurality of third sub pixels SP3 disposed in the 16k-13th column. Therefore, the plurality of first sub pixels SP1 disposed in the 16k-15th column, the plurality of second sub pixels SP2 disposed in the 16k-14th column, the plurality of third sub pixels SP3 disposed in the 16k-13th column, and the plurality of fourth sub pixels SP4 disposed in the 16k-12th column may be connected to the first reference voltage line RVL1.

The second reference voltage line RVL2 is disposed between the plurality of second sub pixels SP2 disposed in the 16k-10th column and the plurality of third sub pixels SP3 disposed in the 16k-9th column. Therefore, the plurality of first sub pixels SP1 disposed in the 16k-11th column, the plurality of second sub pixels SP2 disposed in the 16k-10th column, the plurality of third sub pixels SP3 disposed in the 16k-9th column, and the plurality of fourth sub pixels SP4 disposed in the 16k-8th column may be connected to the second reference voltage line RVL2.

The third reference voltage line RVL3 is disposed between the plurality of second sub pixels SP2 disposed in the 16k-6th column and the plurality of third sub pixels SP3 disposed in the 16k-5th column. Therefore, the plurality of first sub pixels SP1 disposed in the 16k-7th column, the plurality of second sub pixels SP2 disposed in the 16k-6th column, the plurality of third sub pixels SP3 disposed in the 16k-5th column, and the plurality of fourth sub pixels SP4 disposed in the 16k-4th column may be connected to the third reference voltage line RVL3.

The fourth reference voltage line RVL4 is disposed between the plurality of second sub pixels SP2 disposed in the 16k-2nd column and the plurality of third sub pixels SP3 disposed in the 16k-1st column. Therefore, the plurality of first sub pixels SP1 disposed in the 16k-3rd column, the plurality of second sub pixels SP2 disposed in the 16k-2nd column, the plurality of third sub pixels SP3 disposed in the 16k-1st column, and the plurality of fourth sub pixels SP4 disposed in the 16k-th column may be connected to the fourth reference voltage line RVL4.

Hereinafter, a sensing method of a display device according to another example embodiment of the present disclosure will be described with reference to FIG. 6.

Figure 6:
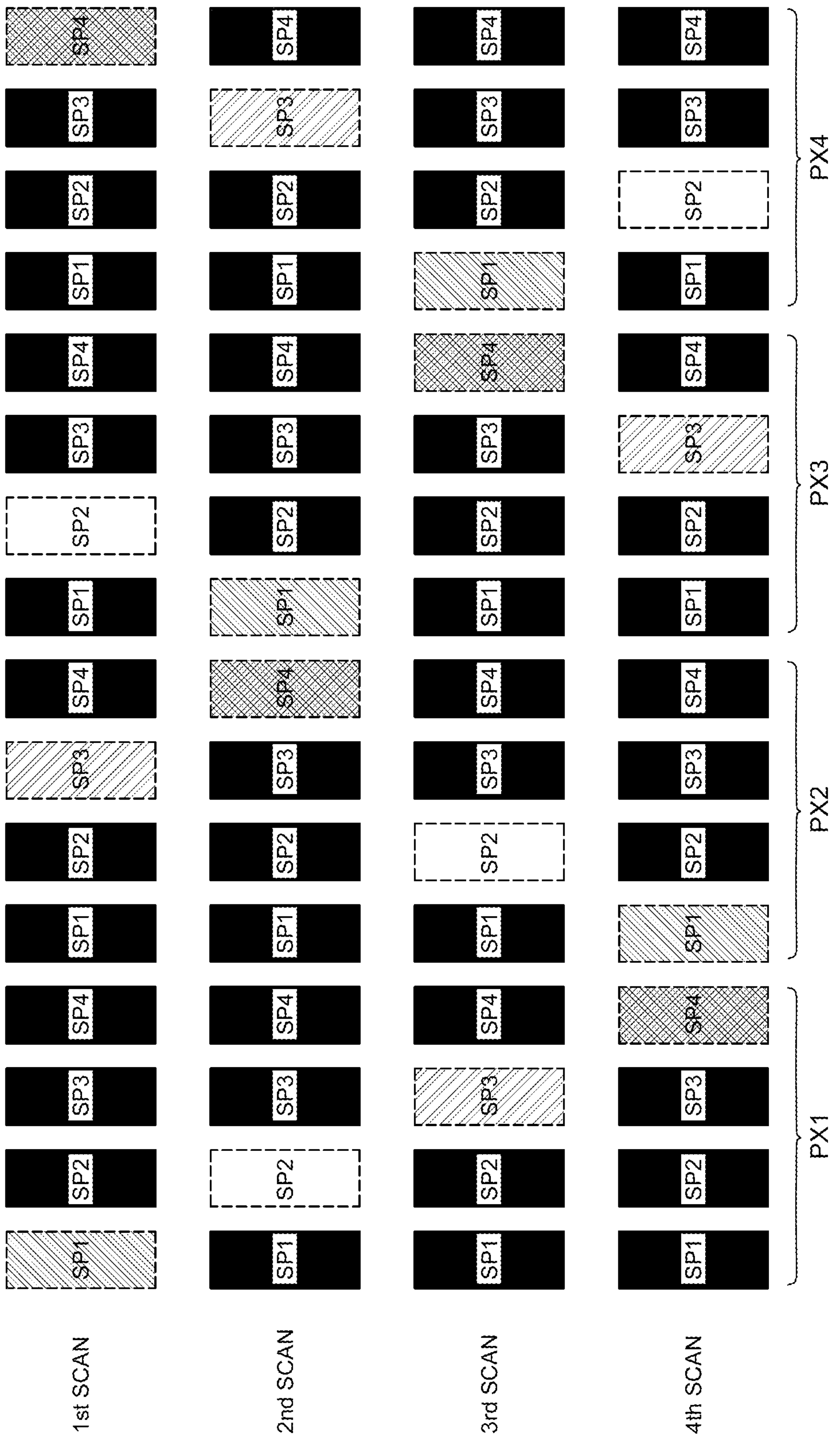
FIG. 6 is a view for explaining a sensing method of a display device according to another example embodiment of the present disclosure in an even-numbered frame.

FIG. 6 is a view for explaining a sensing method of a display device according to another example embodiment of the present disclosure.

In FIG. 6, a state of the plurality of sub pixels disposed in one row, in each of a first scan period 1st SCAN in which a gate high voltage is applied to the first gate line GL1 which is the 4m-3rd gate line, a second scan period 2nd SCAN in which a gate high voltage is applied to the second gate line GL2 which is the 4m-2nd gate line, a third scan period 3rd SCAN in which a gate high voltage is applied to the third gate line GL3 which is the 4m-1st gate line, and a fourth scan period in which a gate high voltage is applied to the fourth gate line GL4 which is the 4m-th gate line is illustrated.

The sub pixels SP1, SP2, SP3, and SP4 illustrated with the dotted lines refer to sub pixels SP1, SP2, SP3, and SP4 in which the sensing is performed in the corresponding scan period and sub pixels SP1, SP2, SP3, and SP4 having a black pattern refer to sub pixels SP1, SP2, SP3, and SP4 in which the sensing is not performed in the corresponding scan period.

Referring to FIGS. 5 and 6, in the first scan period 1st SCAN, the first gate voltage GATE1 is a gate high voltage so that the switching transistor SWT and the sensing transistor SET in the plurality of sub pixels SP1, SP2, SP3, and SP4 connected to the first gate line GL1 are turned on. Further, the plurality of sub pixels SP1, SP2, SP3, and SP4 connected to the first gate line GL1 by each of the plurality of reference voltage lines RVL1, RVL2, RVL3, and RVL4 is sensed.

For example, in the first scan period 1st SCAN, the first sub pixel SP1, which is any one of the sub pixels of the first pixel PX1 is sensed by the first reference voltage line RVL1. The third sub pixel SP3 which is a sub pixel having a different color from the first sub pixel SP1 of the first pixel PX1 connected to the first gate line GL1, among sub pixels of the second pixel PX2, is sensed by the second reference voltage line RVL2. The second sub pixel SP2 which is a sub pixel having a different color from the first sub pixel SP1 of the first pixel PX1 connected to the first gate line GL1 and the third sub pixel SP3 of the second pixel PX2 connected to the first gate line GL1, among sub pixels of the third pixel PX3, is sensed by the third reference voltage line RVL3. The fourth sub pixel SP4 which is a sub pixel having a different color from the first sub pixel SP1 of the first pixel PX1 connected to the first gate line GL1, the third sub pixel SP3 of the second pixel PX2 connected to the first gate line GL1, and the second sub pixel SP2 of the third pixel PX3 connected to the first gate line GL1 among sub pixels of the fourth pixel PX4, is sensed by the fourth reference voltage line RVL4.

In a subsequent second scan period 2nd SCAN, the second gate voltage GATE2 is a gate high voltage so that the switching transistor SWT and the sensing transistor SET in the plurality of sub pixels SP1, SP2, SP3, and SP4 connected to the second gate line GL2 are turned on. Further, the plurality of sub pixels SP1, SP2, SP3, and SP4 connected to the second gate line GL2 is sensed by each of the plurality of reference voltage lines RVL1, RVL2, RVL3, and RVL4.

For example, in the second scan period 2nd SCAN, the second sub pixel SP2, which is the other one of the sub pixels of the first pixel PX1 is sensed by the first reference voltage line RVL1. The fourth sub pixel SP4 which is a sub pixel having a different color from the second sub pixel SP2 of the first pixel PX1 connected to the second gate line GL2, among sub pixels of the second pixel PX2, is sensed by the second reference voltage line RVL2. The first sub pixel SP1 which is a sub pixel having a different color from the second sub pixel SP2 of the first pixel PX1 connected to the second gate line GL2 and the fourth sub pixel SP4 of the second pixel PX2 connected to the second gate line GL2, among sub pixels of the third pixel PX3, is sensed by the third reference voltage line RVL3. The third sub pixel SP3 which is a sub pixel having a different color from the second sub pixel SP2 of the first pixel PX1 connected to the second gate line GL2, the fourth sub pixel SP4 of the second pixel PX2 connected to the second gate line GL2, and the first sub pixel SP1 of the third pixel PX3 connected to the second gate line GL2, among sub pixels of the fourth pixel PX4, is sensed by the fourth reference voltage line RVL4.

In a subsequent third scan period 3rd SCAN, the third gate voltage GATE2 is a gate high voltage so that the switching transistor SWT and the sensing transistor SET in the plurality of sub pixels SP1, SP2, SP3, and SP4 connected to the third gate line GL3 are turned on. Further, the plurality of sub pixels SP1, SP2, SP3, and SP4 connected to the third gate line GL3 is sensed by each of the plurality of reference voltage lines RVL1, RVL2, RVL3, and RVL4.

For example, in the third scan period 3rd SCAN, the third sub pixel SP3, which is another one of the sub pixels of the first pixel PX1, is sensed by the first reference voltage line RVL1. The second sub pixel SP2 which is a sub pixel having a different color from the third sub pixel SP3 of the first pixel PX1 connected to the third gate line GL3, among sub pixels of the second pixel PX2, is sensed by the second reference voltage line RVL2. The fourth sub pixel SP4 which is a sub pixel having a different color from the third sub pixel SP3 of the first pixel PX1 connected to the third gate line GL3 and the second sub pixel SP2 of the second pixel PX2 connected to the third gate line GL3, among sub pixels of the third pixel PX3, is sensed by the third reference voltage line RVL3. The first sub pixel SP1 which is a sub pixel having a different color from the third sub pixel SP3 of the first pixel PX1 connected to the third gate line GL3, the second sub pixel SP2 of the second pixel PX2 connected to the third gate line GL3, and the fourth sub pixel SP4 of the third pixel PX3 connected to the third gate line GL3, among sub pixels of the fourth pixel PX4, is sensed by the fourth reference voltage line RVL4.

In a subsequent fourth scan period 4th SCAN, the fourth gate voltage GATE2 is a gate high voltage so that the switching transistor SWT and the sensing transistor SET in the plurality of sub pixels SP1, SP2, SP3, and SP4 connected to the fourth gate line GL4 are turned on. Further, the plurality of sub pixels SP1, SP2, SP3, and SP4 connected to the fourth gate line GL4 is sensed by each of the plurality of reference voltage lines RVL1, RVL2, RVL3, and RVL4.

For example, in the fourth scan period 4th SCAN, the fourth sub pixel SP4, which is the remaining one of the sub pixels of the first pixel PX1 is sensed by the first reference voltage line RVL1. The first sub pixel SP1 which is a sub pixel having a different color from the fourth sub pixel SP4 of the first pixel PX1 connected to the fourth gate line GL4, among sub pixels of the second pixel PX2, is sensed by the second reference voltage line RVL2. The third sub pixel SP3 which is a sub pixel having a different color from the fourth sub pixel SP4 of the first pixel PX1 connected to the fourth gate line GL4 and the first sub pixel SP1 of the second pixel PX2 connected to the fourth gate line GL4, among sub pixels of the third pixel PX3, is sensed by the third reference voltage line RVL3. The second sub pixel SP2 which is a sub pixel having a different color from the fourth sub pixel SP4 of the first pixel PX1 connected to the fourth gate line GL4 and the first sub pixel SP1 of the second pixel PX2 connected to the fourth gate line GL4, and the third sub pixel SP3 of the third pixel PX3 connected to the fourth gate line GL4, among sub pixels of the fourth pixel PX4, is sensed by the fourth reference voltage line RVL4.

As described above, during one scan period among a plurality of scan periods, sub pixels SP1, SP2, SP3, and SP4 having different colors each other may be sensed.

In the display device of the related art, in one scan period, only one sub pixel among a plurality of sub pixels disposed in a 16k-15th column to a 16k-th column is sensed so that 16 scan periods are necessary to sense all the plurality of sub pixels disposed in the 16k-15th column to 16k-th column.

In contrast, in the display device according to another example embodiment of the present disclosure, in one scan period, four sub pixels among a plurality of sub pixels SP1, SP2, SP3, and SP4 disposed in a 16k-15th column to a 16k-th column are sensed. Therefore, only four scan periods are necessary to sense all the plurality of sub pixels SP1, SP2, SP3, and SP4 disposed in a 16k-15th column to a 16k-th column. Accordingly, the display device according to another example embodiment of the present disclosure may more quickly and accurately sense the plurality of sub pixels.

Hereinafter, a driving method of a display device according to an example embodiment of the present disclosure will be described with reference to FIGS. 7A, 7B, and 8.

Figure 7A:
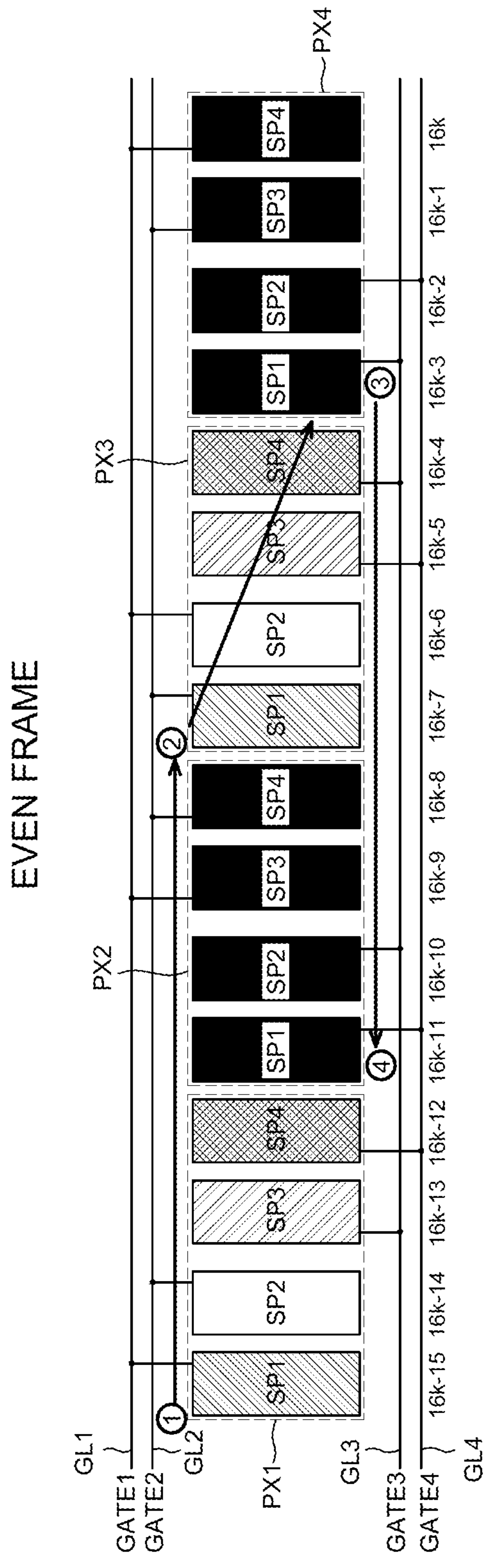
FIG. 7A is a view for explaining a driving order in an odd-numbered frame of a display device according to another example embodiment of the present disclosure.

FIG. 7A is a view for explaining a driving order in an odd-numbered frame of a display device according to another example embodiment of the present disclosure.

Figure 7B:
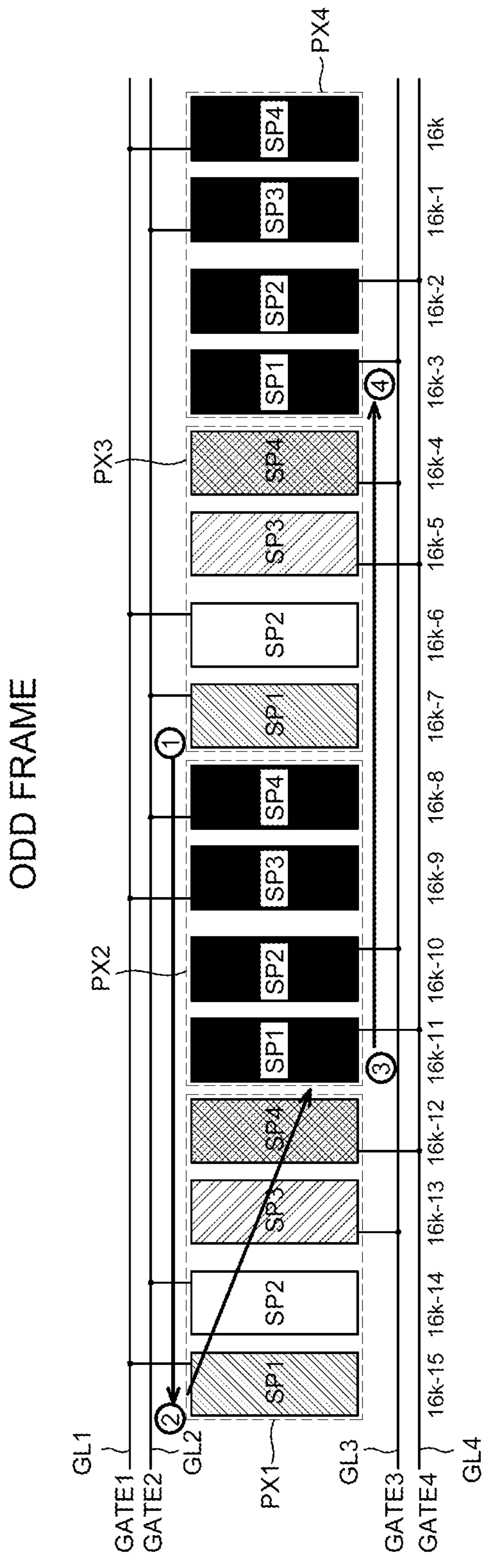
FIG. 7B is a view for explaining a driving order in an even-numbered frame of a display device according to another example embodiment of the present disclosure.

FIG. 7B is a view for explaining a driving order in an even-numbered frame of a display device according to another example embodiment of the present disclosure.

Figure 8:
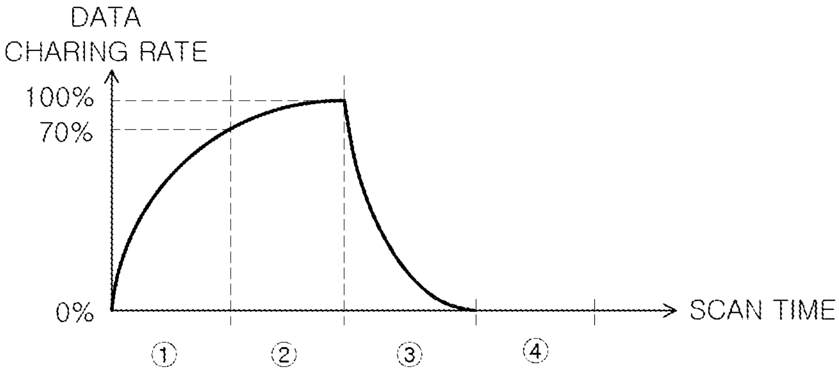
FIG. 8 is a view for explaining a charging rate of a data voltage of a display device according to another example embodiment of the present disclosure.

FIG. 8 is a view for explaining a charging rate of a data voltage of a display device according to an example embodiment of the present disclosure.

Even though in FIGS. 7A and 7B, for the convenience of description, a data line, a reference voltage line, and a high potential voltage line which are vertically disposed are not illustrated, the placement relationship of the data line, the reference voltage line, and the high potential voltage line is the same as described in FIG. 5.

As illustrated in FIGS. 7A and 7B, an example of displaying a vertical stripe pattern in which a plurality of first sub pixels SP1 disposed in a 16k-15th column, a plurality of second sub pixels SP2 disposed in a 16k-14th column, a plurality of third sub pixels SP3 disposed in a 16k-13th column, and a plurality of fourth sub pixels SP4 disposed in a 16k-12th column emit light, a plurality of first sub pixels SP1 in a 16k-11th column, a plurality of second sub pixels SP2 disposed in a 16k-10th column, a plurality of third sub pixels SP3 disposed in a 16k-9th column, and a plurality of fourth sub pixels SP4 disposed in a 16k-8th column do not emit light, a plurality of sub pixels SP1 disposed in a 16k-7th column, a plurality of second sub pixels SP2 disposed in a 16k-6th column, a plurality of third sub pixels SP3 disposed in a 16k-5th column, and a plurality of fourth sub pixels SP4 disposed in a 16k-4th column emit light, and a plurality of sub pixels SP1 disposed in a 16k-3rd column, a plurality of second sub pixels SP2 disposed in a 16k-2nd column, a plurality of third sub pixels SP3 disposed in a 16k-1st column, and a plurality of fourth sub pixels SP4 disposed in a 16k-th column do not emit light will be described.

Hereinafter, a data charging rate of the plurality of first sub pixels SP1 will be described in detail and a data charging rate of the plurality of second sub pixels SP2, a data charging rate of the plurality of third sub pixels SP3, and a data charging rate of the plurality of fourth sub pixels SP4 will be described with the same principle as the data charging rate of the plurality of first sub pixels SP1.

As illustrated in FIG. 8, when the vertical stripe pattern is displayed, a charging rate of the first data voltage DATA1 may increase during a first horizontal period (1) and a second horizontal period (2) and a charging rate of the first data voltage DATA1 may be lowered during a third horizontal period (3) and a fourth horizontal period (4). A charging rate waveform of the first data voltage DATA1 may be repeated.

A turning-on order of the plurality of gate lines GL1, GL2, GL3, and GL4 in an odd-numbered frame may be different from a turning-on order of the plurality of gate lines GL1, GL2, GL3, and GL4 in an even-numbered frame.

Specifically, referring to FIG. 7A, the first gate line GL1, the second gate line GL2, the third gate line GL3, and the fourth gate line GL4 are turned on in turns in the odd-numbered frame. Referring to FIG. 7B, the second gate line GL2, the first gate line GL1, the fourth gate line GL4, and the third gate line GL3 are turned on in turns in the even-numbered frame.

In the meantime, the turning-on order of the plurality of gate lines GL1, GL2, GL3, and GL4 in an odd-numbered frame may be switched to a turning-on order of the plurality of gate lines GL1, GL2, GL3, and GL4 in an even-numbered frame.

For example, referring to FIG. 7A, during the odd-numbered frame, in the first horizontal period (1), the first gate voltage GATE1 is applied to the first gate line GL1 at a turn-on level to charge the first sub pixel SP1 disposed in the 16k-15th column with the data voltage.

During the odd-numbered frame, in the second horizontal period (2), the second gate voltage GATE2 is applied to the second gate line GL2 at a turn-on level to charge the first sub pixel SP1 disposed in the 16k-7th column with the data voltage.

During the odd-numbered frame, in the third horizontal period (3), the third gate voltage GATE3 is applied to the third gate line GL3 at a turn-on level to discharge the data voltage to the first sub pixel SP1 disposed in the 16k-3rd column.

During the odd-numbered frame, in the fourth horizontal period (4), the fourth gate voltage GATE3 is applied to the fourth gate line GL4 at a turn-on level to discharge the data voltage to the first sub pixel SP1 disposed in the 16k-11th column.

Referring to FIG. 7B, during the even-numbered frame, in the first horizontal period (1), the second gate voltage GATE2 is applied to the second gate line GL2 at a turn-on level to charge the first sub pixel SP1 disposed in the 16k-7th column with the data voltage.

During the even-numbered frame, in the second horizontal period (2), the first gate voltage GATE1 is applied to the first gate line GL1 at a turn-on level to charge the first sub pixel SP1 disposed in the 16k-15th column with the data voltage.

During the even-numbered frame, in the third horizontal period (3), the fourth gate voltage GATE4 is applied to the fourth gate line GL4 at a turn-on level to discharge the data voltage to the first sub pixel SP1 disposed in the 16k-11th column.

During the even-numbered frame, in the fourth horizontal period (4), the third gate voltage GATE3 is applied to the third gate line GL3 at a turn-on level to discharge the data voltage to the first sub pixel SP1 disposed in the 16k-3rd column.

As described above, when the vertical stripe pattern is implemented, a data charging rate of the plurality of sub pixels SP1 will be described below, with reference to FIGS. 8, additionally.

During the odd-numbered frame, in the horizontal period (1) at which the charging of the data voltage starts, a data charging rate of the first sub pixel SP1 disposed in the 16k-15th column may be 70% (weak charging).

During the odd-numbered frame, in the second horizontal period (2) in which the charging of the data voltage ends, a charging rate of the first sub pixel SP1 disposed in the 16k-7th column may be 100% (strong charging, that is, full charged amount and rate).

During the odd-numbered frame, in the third horizontal period (3) and the fourth horizontal period (4) in which the data voltage is discharged, charging rates of the first sub pixel SP1 disposed in the 16k-3rd and the first sub pixel SP1 disposed in the 16k-11th column may be 0%.

During the even-numbered frame, in the horizontal period (1) at which the charging of the data voltage starts, a data charging rate of the first sub pixel SP1 disposed in the 16k-7th column may be 70% (weak charging).

During the even-numbered frame, in the second horizontal period (2) in which the charging of the data voltage ends, a charging rate of the first sub pixel SP1 disposed in the 16k-15th column may be 100% (strong charging).

During the odd-numbered frame, in the third horizontal period (3) and the fourth horizontal period (4) in which the data voltage is discharged, charging rates of the first sub pixel SP1 disposed in the 16k-11th and the first sub pixel SP1 disposed in the 16k-3rd column may be 0%.

In summary, the data charging rate of the first sub pixel SP1 disposed in the 16k-15th column is 100% (strong charging) during the odd-numbered frame is about 70% (weak charging) during the even numbered frame. Therefore, an average of the data charging rates of the first sub pixels SP1 disposed in the 16k-15th column may be 85%, that is say 80-90%.

In summary, the data charging rate of the first sub pixel SP1 disposed in the 16k-7th column is 100% (strong charging) during the even-numbered frame and is 70% (weak charging) during the odd numbered frame. Therefore, an average of the data charging rates of the first sub pixels SP1 disposed in the 16k-7th column may also be 85%.

Accordingly, the display device according to another example embodiment of the present disclosure sets a different gate-turn on order for every frame to set an average value of the data charging rate of the sub pixel which emits light from the vertical stripe pattern to be the same.

Accordingly, in the display device according to another example embodiment of the present disclosure, a line defect is not generated even in the specific pattern and a pattern may be more accurately implemented. As a result, an image quality of the display device according to another example embodiment of the present disclosure may be improved.

Hereinafter, a display device according to still another example embodiment (a third example embodiment) of the present disclosure will be described in detail with reference to FIGS. 9 and 10.

Figure 9:
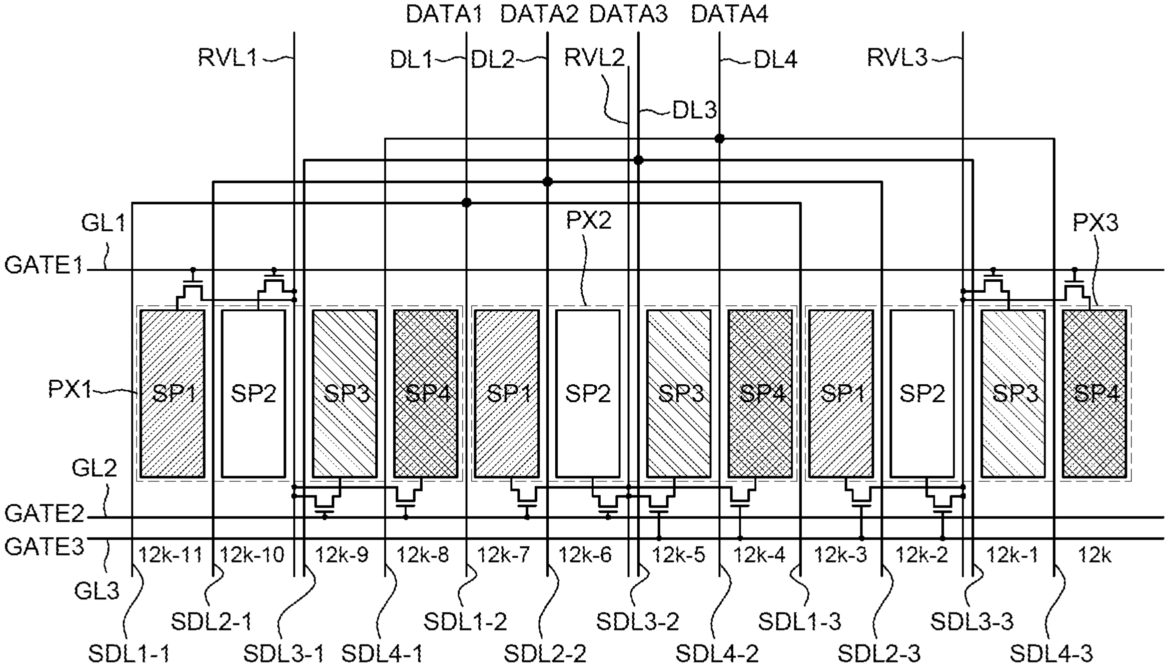
FIG. 9 is a block diagram for explaining a placement relationship of a sub pixel of a display device according to still another example embodiment (a third example embodiment) of the present disclosure.

FIG. 9 is a block diagram for explaining a placement relationship of a sub pixel of a display device according to still another example embodiment (a third example embodiment) of the present disclosure.

In FIG. 9, for the convenience of description, only three pixels PX which are disposed in a one row are illustrated and in the display area, the placement relationship of three pixels PX illustrated in FIG. 3 is repeated. Further, the transistor disposed between the sub pixels SP1, SP2, SP3, and SP4 and the gate line refers to the sensing transistor SET described with reference to FIG. 2.

Referring to FIG. 9, one pixel PX includes four sub pixels SP1, SP2, SP3, and SP4. For example, as illustrated in FIG. 9, the pixel PX may include a first sub pixel SP1, a second sub pixel SP2, a third sub pixel SP3, and a fourth sub pixel SP4. Further, the first sub pixel SP1 is a red sub pixel, the second sub pixel SP2 is a white sub pixel, the third sub pixel SP3 is a blue sub pixel, and the fourth sub pixel SP4 is a green sub pixel. However, the present disclosure is not limited thereto and the plurality of sub pixels may be changed to various colors such as magenta, yellow, and cyan.

The plurality of same color sub pixels SP1, SP2, SP3, and SP4 may be disposed in the same column. That is, the plurality of first sub pixels SP1 is disposed in the same column, the plurality of second sub pixels SP2 is disposed in the same column, the plurality of third sub pixels SP3 is disposed in the same column, and the plurality of fourth sub pixels SP4 is disposed in the same column.

To be more specific, as illustrated in FIG. 9, the plurality of first sub pixels SP1 is disposed in a 12k-11th column, a 12k-7th column, and a 12k-3rd column, the plurality of second sub pixels SP2 is disposed in a 12k-10th column, a 12k-6th column, and a 12k-2nd column, the plurality of third sub pixels SP3 is disposed in a 12k-9th column, a 12k-5th column, and a 12k-1st column, and the plurality of fourth sub pixels SP4 id disposed in a 12k-8th column, a 12k-4th column, and a 12k-th column. Here, k refers to a natural number of 1 or larger.

That is, the first sub pixel SP1, the second sub pixel SP2, the third sub pixel SP3, and the fourth sub pixel SP4 are sequentially repeated with respect to one row.

As illustrated in FIG. 9, the first sub pixel SP1 disposed in the 12k-11th column, the second sub pixel disposed in the 12k-10th column, the third sub pixel disposed in the 12k-9th column, and the fourth sub pixel SP4 disposed in the 12k-8th configure the first pixel PX1. The first sub pixel SP1 disposed in the 12k-7th column, the second sub pixel SP2 disposed in the 12k-6th column, the third sub pixel SP3 disposed in the 12k-5th column, and the fourth sub pixel SP4 disposed in the 12k-4th with respect to one row configure the second pixel PX2. The first sub pixel SP1 disposed in the 12k-3rd column, the second sub pixel SP2 disposed in the 12k-2nd column, the third sub pixel SP3 disposed in the 12k-1st column, and the fourth sub pixel SP4 disposed in the 12k-th with respect to one row configure the third pixel PX3.

Each of the plurality of data lines DL1, DL2, DL3, and DL4 may be divided into the plurality of sub data lines SDL1-1, SDL1-2, SDL1-3, SDL2-1, SDL2-2, SDL2-3, SDL3-1, SDL3-2, SDL3-3, SDL4-1, SDL4-2, and SDL4-3. Specifically, the first data line DL1 is branched into a plurality of first sub data lines SDL1-1, SDL1-2, and SDL1-3, and the second data line DL2 is branched into a plurality of second sub data lines SDL2-1, SDL2-2, and SDL2-3. Further, the third data line DL3 is branched into a plurality of third sub data lines SDL3-1, SDL3-2, and SDL3-3 and the fourth data line DL4 is branched into a plurality of fourth sub data lines SDL4-1, SDL4-2, and SDL4-3.

The first sub data lines SDL1-1, SDL1-2, and SDL1-3 may include a 1-1th sub data line SDL1-1, a 1-2th sub data line SDL1-2, and a 1-3th sub data line SDL1-3 and the second sub data lines SDL2-1, SDL2-2, and SDL2-3 may include a 2-1th sub data line SDL2-1, a 2-2th sub data line SDL2-2, and a 2-3th sub data line SDL2-3. The third sub data lines SDL3-1, SDL3-2, and SDL3-3 may include a 3-1th sub data line SDL3-1, a 3-2th sub data line SDL3-2, and a 3-3th sub data line SDL3-3 and the fourth sub data lines SDL4-1, SDL4-2, and SDL4-3 may include a 4-1th sub data line SDL4-1, a 4-2th sub data line SDL4-2, and a 4-3th sub data line SDL4-3.

The plurality of first sub data lines SDL1-1, SDL1-2, and SDL1-3 is disposed to be adjacent to the first sub pixels SP1 to be connected to the plurality of first sub pixels SP1.

Specifically, the plurality of 1-1st sub data lines SDL1-1 is disposed at one side of the plurality of first sub pixels SP1 disposed in the 12k-11th column to be electrically connected to the plurality of first sub pixels SP1 disposed in the 12k-11th column. The plurality of 1-2nd sub data lines SDL 1-2 is disposed between a plurality of first sub pixels SP1 disposed in the 12k-7th column and a plurality of fourth sub pixels SP4 disposed in the 12k-8th column to be electrically connected to the plurality of first sub pixels SP1 disposed in the 12k-7th column. The plurality of 1-3rd sub data lines SDL1-3 is disposed between a plurality of first sub pixels SP1 disposed in the 12k-3rd column and a plurality of fourth sub pixels SP4 disposed in the 12k-4th column to be electrically connected to the plurality of first sub pixels SP1 disposed in the 12k-3rd column.

The plurality of second sub data lines SDL2-1, SDL2-2, and SDL2-3 is disposed to be adjacent to the plurality of second sub pixels SP2 to be connected to the plurality of second sub pixels SP2.

The plurality of third sub data lines SDL3-1, SDL3-2, and SDL3-3 is disposed to be adjacent to the plurality of third sub pixels SP3 to be connected to the plurality of third sub pixels SP3.

The plurality of fourth sub data lines SDL4-1, SDL4-2, and SDL4-3, is disposed to be adjacent to the plurality of fourth sub pixels SP4 to be connected to the plurality of fourth sub pixels SP4.

The placement structures of the plurality of second sub data lines SDL2-1, SDL2-2, and SDL2-3, the plurality of third sub data lines SDL3-1, SDL3-2, and SDL3-3, and the plurality of fourth sub data lines SDL4-1, SDL4-2, and SDL4-3, may be repeated like the placement structure of the plurality of first sub data lines SDL1-1, SDL1-2, and SDL1-3.

A first data voltage DATA1 which is a red data voltage may be applied to the first data line DL1 and a second data voltage DATA2 which is a white data voltage may be applied to the second data line DL2. Further, a third data voltage DATA3 which is a blue data voltage may be applied to the third data line DL3 and a fourth data voltage DATA4 which is a green data voltage may be applied to the fourth data line DL4.

Therefore, the first data voltage DATA1 which is a red data voltage may be applied to the plurality of first sub data lines SDL1-1, SDL1-2, and SDL1-3 and the second data voltage DATA2 which is a white data voltage may be applied to the plurality of second sub data lines SDL2-1, SDL2-2, and SDL2-3. Further, the third data voltage DATA3 which is a blue data voltage may be applied to the plurality of third sub data lines SDL3-1, SDL3-2, and SDL3-3 and the fourth data voltage DATA4 which is a green data voltage may be applied to the plurality of fourth sub data lines SDL4-1, SDL4-2, and SDL4-3.

Each of the plurality of gate lines GATE1 to GATE3 may be disposed on both sides of the plurality of sub pixels SP1, SP2, SP3, and SP4.

Specifically, referring to FIG. 9, the first gate line GL1 is disposed at one side of the plurality of sub pixels SP1, SP2, SP3, and SP4 and the second gate line GL2 and the third gate line GL3 may be disposed at the other side of the plurality of sub pixels SP1, SP2, SP3, and SP4. To be general, the first gate line GL1 which is a 3m-2nd gate line is disposed at one side of the plurality of sub pixels SP1, SP2, SP3, and SP4 and the second gate line GL2 which is a 3m-1st gate line and the third gate line GL3 which is a 3m-th gate line may be disposed at the other side of the plurality of sub pixels SP1, SP2, SP3, and SP4. Here, m is a natural number of 1 or larger.

Any one of the plurality of gate lines GL1 to GL3 is connected to the first sub pixel SP1 of the first pixel PX1, the second sub pixel SP2 of the first pixel PX1, the third sub pixel SP3 of the third pixel PX3, and the fourth sub pixel SP4 of the third pixel PX3. The other one of the plurality of gate lines GL1 to GL3 is connected to the third sub pixel SP3 of the first pixel PX1, the fourth sub pixel SP4 of the first pixel PX1, the first sub pixel SP1 of the second pixel PX2, and the second sub pixel SP2 of the second pixel PX2. The remaining one of the plurality of gate lines GL1 to GL3 is connected to the third sub pixel SP3 of the second pixel PX2, the fourth sub pixel SP4 of the second pixel PX2, the first sub pixel SP1 of the second pixel PX2, and the second sub pixel SP2 of the second pixel PX2.

For example, the first gate line GL1 which is a 3m-2nd gate line may be connected to the first sub pixel SP1 of the first pixel PX1, the second sub pixel SP2 of the first pixel PX1, the third sub pixel SP3 of the third pixel PX3, and the fourth sub pixel SP4 of the third pixel PX3.

The second gate line GL2 which is a 3m-1st gate line may be connected to the first sub pixel SP1 of the first pixel PX1, the second sub pixel SP2 of the first pixel PX1, the third sub pixel SP3 of the third pixel PX3, and the fourth sub pixel SP4 of the third pixel PX3.

The third gate line GL3 which is a 3m-th gate line may be connected to the third sub pixel SP3 of the second pixel PX2, the fourth sub pixel SP4 of the second pixel PX2, the first sub pixel SP1 of the second pixel PX2, and the second sub pixel SP2 of the second pixel PX2.

However, the plurality of gate lines GL1 to GL3 and the plurality of sub pixels SP1, SP2, SP3, and SP4 are not limited to the above-described example, but may vary in various ways.

Each of the plurality of reference voltage lines RVL1, RVL2, and RVL3 may be disposed in one pixel PX1, PX2, and PX3.

That is, the first reference line RVL1 is disposed inside the first pixel PX1, the second reference line RVL2 is disposed inside the second pixel PX2, and the third reference line RVL3 is disposed inside the third pixel PX3.

Specifically, a first reference voltage line RVL1 is disposed between the plurality of second sub pixels SP2 disposed in the 12k-10th column and the plurality of third sub pixels SP3 disposed in the 12k-9th column. Therefore, the plurality of first sub pixels SP1 disposed in the 12k-11th column, the plurality of second sub pixels SP2 disposed in the 12k-10th column, the plurality of third sub pixels SP3 disposed in the 12k-9th column, and the plurality of fourth sub pixels SP4 disposed in the 12k-8th column may be connected to the first reference voltage line RVL1.

The second reference voltage line RVL2 is disposed between the plurality of second sub pixels SP2 disposed in the 12k-6th column and the plurality of third sub pixels SP3 disposed in the 12k-5th column. Therefore, the plurality of first sub pixels SP1 disposed in the 12k-7th column, the plurality of second sub pixels SP2 disposed in the 12k-6th column, the plurality of third sub pixels SP3 disposed in the 12k-5th column, and the plurality of fourth sub pixels SP4 disposed in the 12k-4th column may be connected to the second reference voltage line RVL2.

The third reference voltage line RVL3 is disposed between the plurality of second sub pixels SP2 disposed in the 12k-2nd column and the plurality of third sub pixels SP3 disposed in the 12k-1st column. Therefore, the plurality of first sub pixels SP1 disposed in the 12k-3rd column, the plurality of second sub pixels SP2 disposed in the 12k-2th column, the plurality of third sub pixels SP3 disposed in the 12k-1st column, and the plurality of fourth sub pixels SP4 disposed in the 12k-th column may be connected to the third reference voltage line RVL3.

Hereinafter, a sensing method of a display device according to still another example embodiment (third example embodiment) of the present disclosure will be described with reference to FIG. 10.

Figure 10:
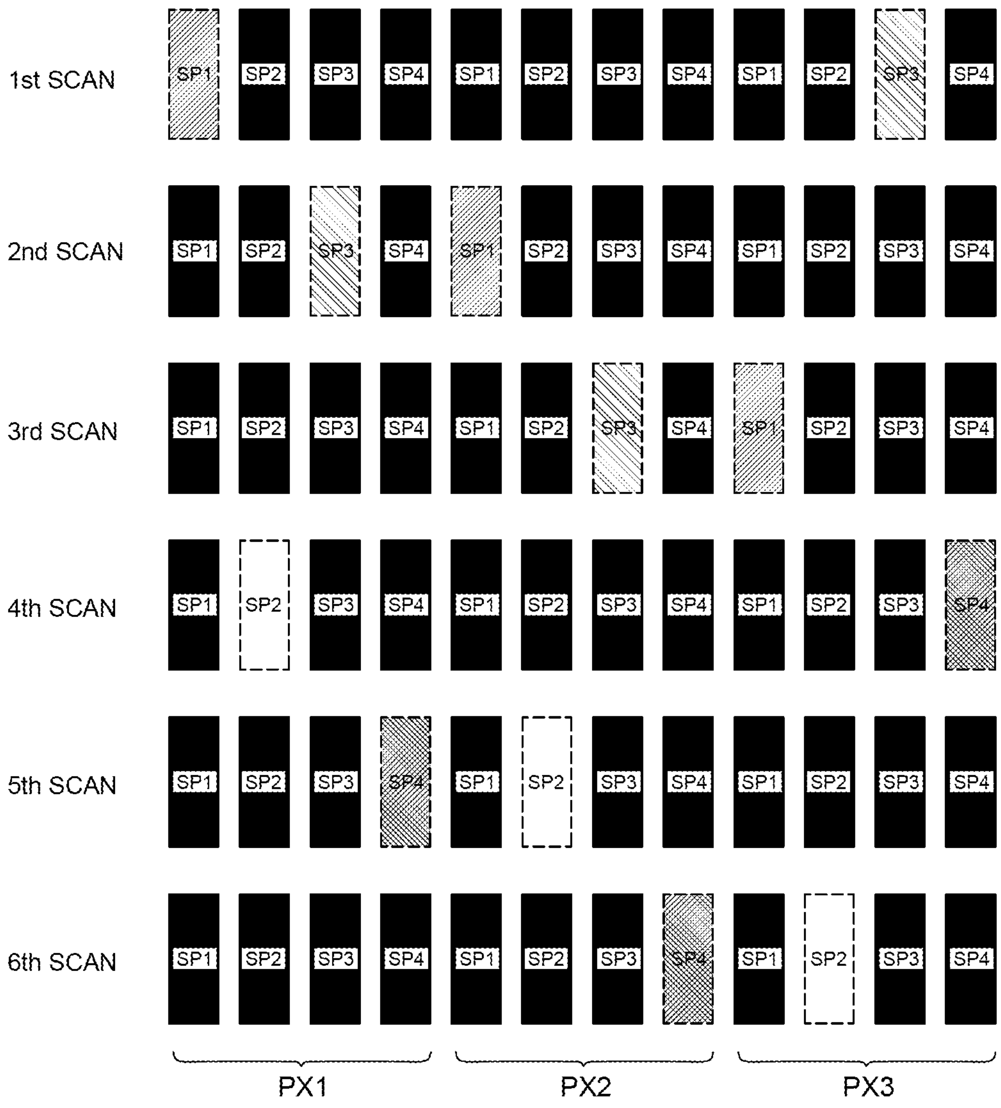
FIG. 10 is a view for explaining a sensing method of a display device according to still another example embodiment (a third example embodiment) of the present disclosure.

FIG. 10 is a view for explaining a sensing method of a display device according to still another example embodiment (a third example embodiment) of the present disclosure.

In FIG. 10, a state of the plurality of sub pixels disposed in one row in each of a first scan period 1st SCAN and a fourth scan period 4th SCAN in which a gate high voltage is applied to the first gate line GL1, a second scan period 2nd SCAN and a fifth scan period 5th SCAN in which a gate high voltage is applied to the second gate line GL2, and a third scan period 3rd SCAN and a sixth scan period 6th SCAN in which a gate high voltage is applied to the third gate line GL3 is illustrated.

The sub pixels SP1, SP2, SP3, and SP4 illustrated with the dotted lines refer to sub pixels SP1, SP2, SP3, and SP4 in which the sensing is performed in the corresponding scan period and sub pixels SP1, SP2, SP3, and SP4 having a black pattern refer to sub pixels SP1, SP2, SP3, and SP4 in which the sensing is not performed in the corresponding scan period.

Referring to FIGS. 9 and 10, in the first scan period 1st SCAN, the first gate voltage GATE1 is a gate high voltage so that the switching transistor SWT and the sensing transistor SET in the plurality of sub pixels SP1, SP2, SP3, and SP4 connected to the first gate line GL1 are turned on. Further, some of the plurality of sub pixels SP1, SP2, SP3, and SP4 connected to the first gate line GL1 by each of the plurality of reference voltage lines RVL1, RVL2, and RVL3 is sensed.

For example, in the first scan period 1st SCAN, the first sub pixel SP1 of the first pixel PX1 is sensed by the first reference voltage line RVL1 and the third sub pixel SP3 of the third pixel PX3 is sensed by the third reference voltage line RVL3.

In a subsequent second scan period 2nd SCAN, the second gate voltage GATE2 is a gate high voltage so that the switching transistor SWT and the sensing transistor SET in the plurality of sub pixels SP1, SP2, SP3, and SP4 connected to the second gate line GL2 are turned on. Further, some of the plurality of sub pixels SP1, SP2, SP3, and SP4 connected to the second gate line GL2 is sensed by each of the plurality of reference voltage lines RVL1, RVL2, and RVL3.

For example, in the second scan period 2nd SCAN, the third sub pixel SP3 of the first pixel PX1 is sensed by the first reference voltage line RVL1 and the first sub pixel SP1 of the second pixel PX2 is sensed by the second reference voltage line RVL2.

In a subsequent third scan period 3rd SCAN, the third gate voltage GATE2 is a gate high voltage so that the switching transistor SWT and the sensing transistor SET in the plurality of sub pixels SP1, SP2, SP3, and SP4 connected to the third gate line GL3 are turned on. Further, some of the plurality of sub pixels SP1, SP2, SP3, and SP4 connected to the third gate line GL3 is sensed by each of the plurality of reference voltage lines RVL1, RVL2, and RVL3.

For example, in the third scan period 3rd SCAN, the third sub pixel SP3 of the second pixel PX2 is sensed by the second reference voltage line RVL2 and the first sub pixel SP1 of the third pixel PX3 is sensed by the third reference voltage line RVL3.

In a subsequent fourth scan period 4th SCAN, the first gate voltage GATE1 is a gate high voltage so that the switching transistor SWT and the sensing transistor SET in the plurality of sub pixels SP1, SP2, SP3, and SP4 connected to the second gate line GL2 are turned on. Further, some of the plurality of sub pixels SP1, SP2, SP3, and SP4 connected to the first gate line GL1 is sensed by each of the plurality of reference voltage lines RVL1, RVL2, and RVL3.

For example, in the fourth scan period 4th SCAN, the second sub pixel SP2 of the first pixel PX1 is sensed by the first reference voltage line RVL1 and the fourth sub pixel SP4 of the third pixel PX3 is sensed by the third reference voltage line RVL3.

In a subsequent fifth scan period 5th SCAN, the second gate voltage GATE2 is a gate high voltage so that the switching transistor SWT and the sensing transistor SET in the plurality of sub pixels SP1, SP2, SP3, and SP4 connected to the second gate line GL2 are turned on. Further, some of the plurality of sub pixels SP1, SP2, SP3, and SP4 connected to the second gate line GL2 is sensed by each of the plurality of reference voltage lines RVL1, RVL2, and RVL3.

For example, in the fifth scan period 5th SCAN, the fourth sub pixel SP4 of the first pixel PX1 is sensed by the first reference voltage line RVL1 and the second sub pixel SP2 of the second pixel PX2 is sensed by the second reference voltage line RVL2.

In a subsequent sixth scan period 6th SCAN, the third gate voltage GATE3 is a gate high voltage so that the switching transistor SWT and the sensing transistor SET in the plurality of sub pixels SP1, SP2, SP3, and SP4 connected to the third gate line GL3 are turned on. Further, some of the plurality of sub pixels SP1, SP2, SP3, and SP4 connected to the third gate line GL3 is sensed by each of the plurality of reference voltage lines RVL1, RVL2, and RVL3.

For example, in the sixth scan period 6th SCAN, the fourth sub pixel SP4 of the second pixel PX2 is sensed by the second reference voltage line RVL2 and the second sub pixel SP2 of the third pixel PX3 is sensed by the third reference voltage line RVL3.

As described above, during one scan period among a plurality of scan periods, sub pixels SP1, SP2, SP3, and SP4 having different colors each other may be sensed.

Further, in the display device of the related art, in one scan period, only one sub pixel among a plurality of sub pixels disposed in a 12k-11th column to a 12k-th column is sensed so that 12 sensing periods are necessary to sense all the plurality of sub pixels disposed in the 12k-11th column to 12k-th column.

In contrast, in the display device according to another example embodiment (a third example embodiment) of the present disclosure, in one scan period, two sub pixels among a plurality of sub pixels SP1, SP2, SP3, and SP4 disposed in a 12k-11th column to a 12k-th column are sensed. Therefore, only six scan periods are necessary to sense all the plurality of sub pixels SP1, SP2, SP3, and SP4 disposed in a 12k-11th column to a 12k-th column. Accordingly, the display device according to another example embodiment (a third example embodiment) of the present disclosure may more quickly sense the plurality of sub pixels.

Hereinafter, a display device according to still another example embodiment (a fourth example embodiment) of the present disclosure will be described. The only difference between the display device according to still another example embodiment (a fourth example embodiment) of the present disclosure and the display device according to another example embodiment (a third example embodiment) of the present disclosure is a connection relationship of the plurality of gate lines GL1 to GL3 and the plurality of sub pixels SP1, SP2, SP3, and SP4 so that it will be mainly described. Therefore, a repeated description of the display device according to still another example embodiment (a fourth example embodiment) of the present disclosure and the display device according to still another example embodiment (a third example embodiment) of the present disclosure will be omitted.

Figure 11:
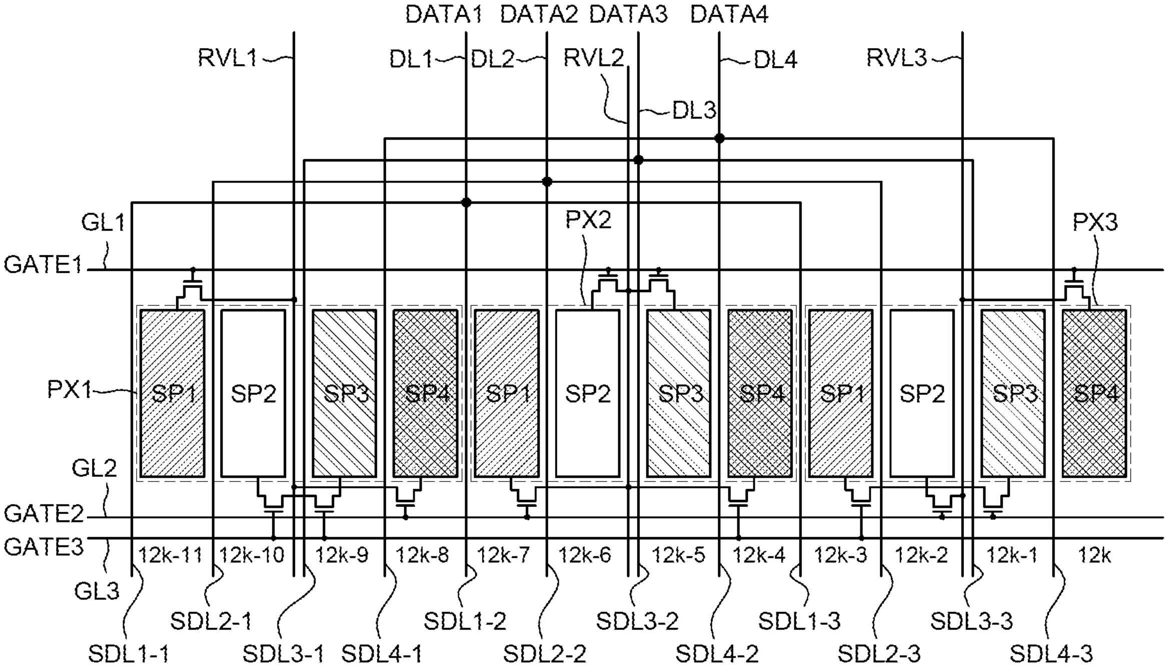
FIG. 11 is a block diagram for explaining a placement relationship of a sub pixel of a display device according to still another example embodiment (a fourth example embodiment) of the present disclosure.

FIG. 11 is a block diagram for explaining a placement relationship of a sub pixel of a display device according to still another example embodiment (a fourth example embodiment) of the present disclosure.

Referring to FIG. 11, any one of the plurality of gate lines GL1 to GL3 is connected to a first sub pixel SP1 of the first pixel PX1, a second sub pixel SP2 of the second pixel PX2, a third sub pixel SP3 of the second pixel PX2, and a fourth sub pixel SP4 of the third pixel PX3.

The other one of the plurality of gate lines GL1 to GL3 is connected to the fourth sub pixel SP4 of the first pixel PX1, the first sub pixel SP1 of the second pixel PX2, the second sub pixel SP2 of the third pixel PX3, and the third sub pixel SP3 of the third pixel PX3.

The remaining one of the plurality of gate lines GL1 to GL3 is connected to the second sub pixel SP2 of the first pixel PX1, the third sub pixel SP3 of the first pixel PX1, the fourth sub pixel SP4 of the second pixel PX2, and the first sub pixel SP1 of the third pixel PX3.

For example, the first gate line GL1 which is a 3m-2nd gate line may be connected to the first sub pixel SP1 of the first pixel PX1, the second sub pixel SP2 of the second pixel PX2, the third sub pixel SP3 of the second pixel PX2, and the fourth sub pixel SP4 of the third pixel PX3.

The second gate line GL2 which is a 3m-1st gate line may be connected to the fourth sub pixel SP4 of the first pixel PX1, the first sub pixel SP1 of the second pixel PX2, the second sub pixel SP2 of the third pixel PX3, and the third sub pixel SP3 of the third pixel PX3.

The third gate line GL3 which is a 3m-th gate line may be connected to the second sub pixel SP2 of the first pixel PX1, the third sub pixel SP3 of the first pixel PX1, the fourth sub pixel SP4 of the second pixel PX2, and the first sub pixel SP1 of the third pixel PX3.

However, the plurality of gate lines GL1 to GL3 and the plurality of sub pixels SP1, SP2, SP3, and SP4 are not limited to the above-described example, therefore may vary in various ways.

Hereinafter, a sensing method of a display device according to still another example embodiment (a fourth example embodiment) of the present disclosure will be described with reference to FIG. 12.

Figure 12:
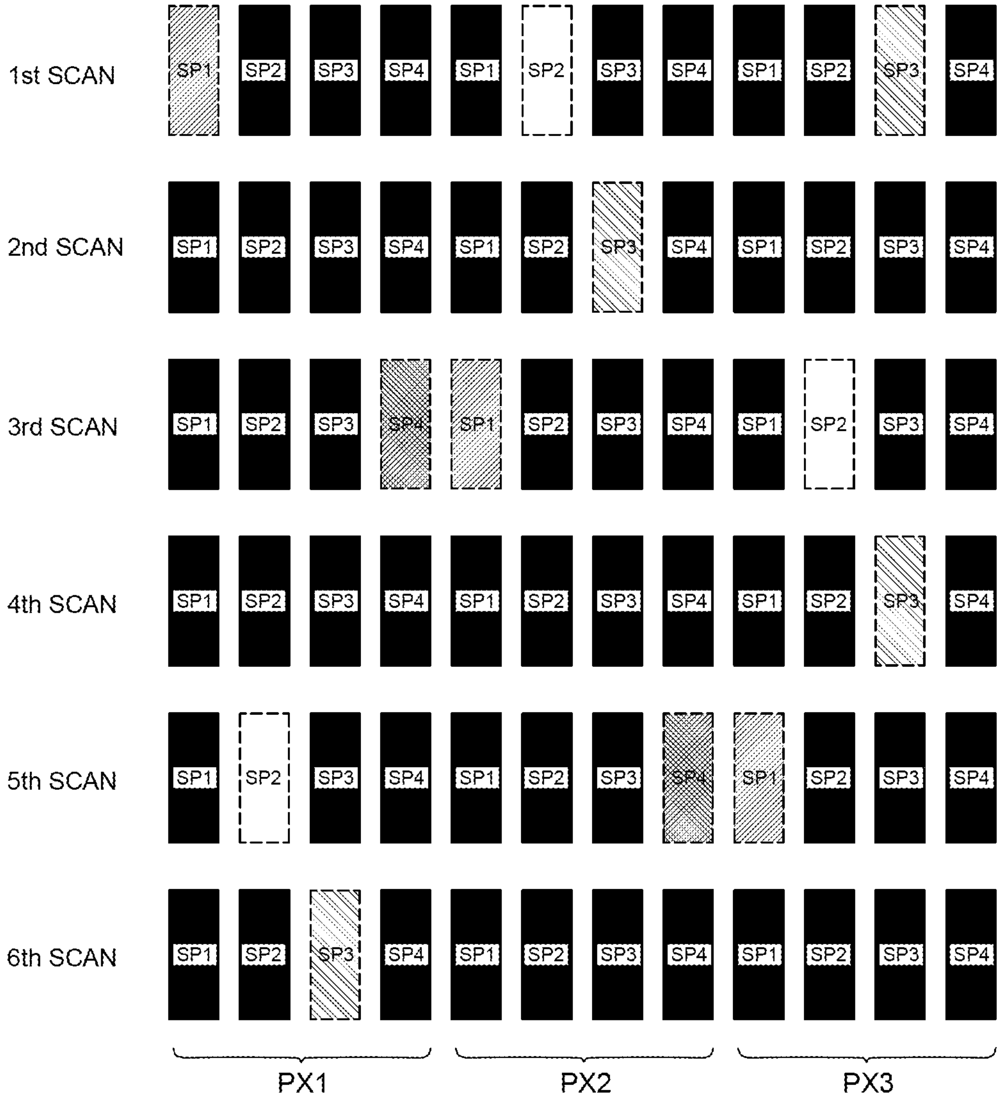
FIG. 12 is a view for explaining a sensing method of a display device according to still another example embodiment (a fourth example embodiment) of the present disclosure.

FIG. 12 is a view for explaining a sensing method of a display device according to still another example embodiment (a fourth example embodiment) of the present disclosure.

In FIG. 12, a state of the plurality of sub pixels disposed in one row in each of a first scan period 1st SCAN and a second scan period 2nd SCAN in which a gate high voltage is applied to the first gate line GL1, a third scan period 3rd SCAN and a fourth scan period 4th SCAN in which a gate high voltage is applied to the second gate line GL2, and a fifth scan period 5th SCAN and a sixth scan period 6th SCAN in which a gate high voltage is applied to the third gate line GL3 is illustrated.

The sub pixels SP1, SP2, SP3, and SP4 illustrated with the dotted lines refer to sub pixels SP1, SP2, SP3, and SP4 in which the sensing is performed in the corresponding scan period and sub pixels SP1, SP2, SP3, and SP4 having a black pattern refer to sub pixels SP1, SP2, SP3, and SP4 in which the sensing is not performed in the corresponding scan period.

Referring to FIGS. 11 and 12, in the first scan period 1st SCAN, the first gate voltage GATE1 is a gate high voltage so that the switching transistor SWT and the sensing transistor SET in the plurality of sub pixels SP1, SP2, SP3, and SP4 connected to the first gate line GL1 are turned on. Further, some of the plurality of sub pixels SP1, SP2, SP3, and SP4 connected to the first gate line GL1 by each of the plurality of reference voltage lines RVL1, RVL2, and RVL3 is sensed.

For example, in the first scan period 1st SCAN, the first sub pixel SP1 of the first pixel PX1 is sensed by the first reference voltage line RVL1, the second sub pixel SP2 of the second pixel PX2 is sensed by the second reference voltage line RVL2, and the third sub pixel SP3 of the third pixel PX3 is sensed by the third reference voltage line RVL3.

In a subsequent second scan period 2nd SCAN, the first gate voltage GATE1 is a gate high voltage so that the switching transistor SWT and the sensing transistor SET in the plurality of sub pixels SP1, SP2, SP3, and SP4 connected to the second gate line GL2 are turned on. Further, some of the plurality of sub pixels SP1, SP2, SP3, and SP4 connected to the first gate line GL1 is sensed by each of the plurality of reference voltage lines RVL1, RVL2, and RVL3.

For example, in the second scan period 2nd SCAN, the second sub pixel SP2 of the second pixel PX2 is sensed by the second reference voltage line RVL2.

In a subsequent third scan period 3rd SCAN, the second gate voltage GATE2 is a gate high voltage so that the switching transistor SWT and the sensing transistor SET in the plurality of sub pixels SP1, SP2, SP3, and SP4 connected to the second gate line GL2 are turned on. Further, some of the plurality of sub pixels SP1, SP2, SP3, and SP4 connected to the second gate line GL2 is sensed by each of the plurality of reference voltage lines RVL1, RVL2, and RVL3.

For example, in the third scan period 3rd SCAN, the fourth sub pixel SP4 of the first pixel PX1 is sensed by the first reference voltage line RVL1, the first sub pixel SP1 of the second pixel PX2 is sensed by the second reference voltage line RVL2, and the second sub pixel SP2 of the third pixel PX3 is sensed by the third reference voltage line RVL3.

In a subsequent fourth scan period 4th SCAN, the second gate voltage GATE2 is a gate high voltage so that the switching transistor SWT and the sensing transistor SET in the plurality of sub pixels SP1, SP2, SP3, and SP4 connected to the second gate line GL2 are turned on. Further, some of the plurality of sub pixels SP1, SP2, SP3, and SP4 connected to the second gate line GL2 is sensed by each of the plurality of reference voltage lines RVL1, RVL2, and RVL3.

For example, in the fourth scan period 4th SCAN, the third sub pixel SP3 of the third pixel PX3 is sensed by the third reference voltage line RVL3.

In a subsequent fifth scan period 5th SCAN, the third gate voltage GATE3 is a gate high voltage so that the switching transistor SWT and the sensing transistor SET in the plurality of sub pixels SP1, SP2, SP3, and SP4 connected to the third gate line GL3 are turned on. Further, some of the plurality of sub pixels SP1, SP2, SP3, and SP4 connected to the third gate line GL3 is sensed by each of the plurality of reference voltage lines RVL1, RVL2, and RVL3.

For example, in the fourth scan period 5th SCAN, the second sub pixel SP2 of the first pixel PX1 is sensed by the first reference voltage line RVL1, the fourth sub pixel SP4 of the second pixel PX2 is sensed by the second reference voltage line RVL2, and the first sub pixel SP1 of the third pixel PX3 is sensed by the third reference voltage line RVL3.

In a subsequent sixth scan period 6th SCAN, the third gate voltage GATE3 is a gate high voltage so that the switching transistor SWT and the sensing transistor SET in the plurality of sub pixels SP1, SP2, SP3, and SP4 connected to the third gate line GL3 are turned on. Further, some of the plurality of sub pixels SP1, SP2, SP3, and SP4 connected to the third gate line GL3 is sensed by each of the plurality of reference voltage lines RVL1, RVL2, and RVL3.

For example, in the sixth scan period 6th SCAN, the third sub pixel SP3 of the first pixel PX1 is sensed by the first reference voltage line RVL1.

As described above, during one scan period among a plurality of scan periods, sub pixels SP1, SP2, SP3, and SP4 having different colors may be sensed.

Further, in the display device of the related art, in one scan period, only one sub pixel among a plurality of sub pixels disposed in a 12k-11th column to a 12k-th column is sensed so that 12 sensing periods are necessary to sense all the plurality of sub pixels disposed in the 12k-11th column to 12k-th column.

In contrast, in the display device according to another example embodiment (a fourth example embodiment) of the present disclosure, in one scan period, three or one sub pixel among a plurality of sub pixels SP1, SP2, SP3, and SP4 disposed in a 12k-11th column to a 12k-th column are sensed. Therefore, only six scan periods are necessary to sense all the plurality of sub pixels SP1, SP2, SP3, and SP4 disposed in a 12k-11th column to a 12k-th column. Accordingly, the display device according to another example embodiment (a fourth example embodiment) of the present disclosure may more quickly and accurately sense the plurality of sub pixels.

The example embodiments of the present disclosure can also be described as follows:

According to an aspect of the present disclosure, a display device includes a display panel in which a plurality of pixels including a first sub pixel, a second sub pixel, and a third sub pixel each having a different color is disposed; a data driver configured to supply a data voltage to the plurality of pixels via a plurality of data lines using a sensing result of the plurality of pixels via a first reference voltage line, a second reference voltage line, and a third reference line; and a gate driver configured to supply a gate signal to the plurality of pixels via a plurality of gate lines, in which the plurality of first sub pixels is disposed in a 9k-8th column, a 9k-5th column, and a 9k-2th column, in which the plurality of second sub pixels is disposed in a 9k-7th column, a 9k-4th column, and a 9k-1st column, the plurality of third sub pixels is disposed in a 9k-6th column, a 9k-3rd column, and a 9k-th column, each of the plurality of data lines is branched into a plurality of sub data lines and each of the plurality of sub data lines is connected to a plurality of sub pixels having the same color, the first reference voltage line is connected to the plurality of first sub pixels disposed in the 9k-8th column, the plurality of second sub pixels disposed in the 9k-7th column, and the plurality of third sub pixels disposed in the 9k-6th column, the second reference voltage line is connected to the plurality of first sub pixels disposed in the 9k-5th column, the plurality of second sub pixels disposed in the 9k-4th column, and the plurality of third sub pixels disposed in the 9k-3th column, and the third reference voltage line is connected to the plurality of first sub pixels disposed in the 9k-2nd column, the plurality of second sub pixels disposed in the 9-1st column, and the plurality of third sub pixels disposed in the 9k-th column to improve a sensing speed of the sub pixel.

With respect to one row, any one of the plurality of first sub pixels disposed in the 9k-8th column, any one of the plurality of second sub pixels disposed in the 9k-7th column, and any one of the plurality of third sub pixels disposed in the 9k-6th column may configure a first pixel, any one of the plurality of first sub pixels disposed in the 9k-5th column, any one of the plurality of second sub pixels disposed in the 9k-4th column, and any one of the plurality of third sub pixels disposed in the 9k-3rd column may configure a second pixel, any one of the plurality of first sub pixels disposed in the 9k-2nd column, any one of the plurality of second sub pixels disposed in the 9k-1st column, and any one of the plurality of third sub pixels disposed in the 9k-th column may configure a third pixel.

In each of the first pixel, the second pixel, and the third pixel, the first sub pixel, the second sub pixel, and the third sub pixel may be connected to different gate lines each other.

A plurality of first sub pixels included in the first pixel, the second pixel, and the third pixel may be connected to different gate lines each other, a plurality of second sub pixels included in the first pixel, the second pixel, and the third pixel may be connected to different gate lines each other, and a plurality of third sub pixels included in the first pixel, the second pixel, and the third pixel may be connected to different gate lines each other.

A 3m-2nd gate line may be connected to any one sub pixel of the sub pixels of the first pixel, a sub pixel having a different color from the sub pixel of the first pixel connected to the 3m-2nd gate line, among sub pixels of the second pixel, and a sub pixel having a different color from the sub pixel of the first pixel connected to the 3m-2nd gate line and the sub pixel of the second pixel connected to the 3m-2nd gate line, among sub pixels of the third pixel (m is a natural number of 1 or larger).

A 3m-1st gate line is connected to the other one sub pixel of the sub pixels of the first pixel, a sub pixel having a different color from the sub pixel of the first pixel connected to the 3m-1 st gate line, among sub pixels of the second pixel, and a sub pixel having a different color from the sub pixel of the first pixel connected to the 3m-1st gate line and the sub pixel of the second pixel connected to the 3m-1st gate line, among sub pixels of the third pixel.

A 3m-th gate line may be connected to another one sub pixel of the sub pixels of the first pixel, a sub pixel having a different color from the sub pixel of the first pixel connected to the 3m-th gate line, among sub pixels of the second pixel, and a sub pixel having a different color from the sub pixel of the first pixel connected to the 3m-th gate line and the sub pixel of the second pixel connected to the 3m-th gate line, among sub pixels of the third pixel.

In a first scan period, a gate high voltage may be applied to the 3m-2nd gate line, in a second scan period, a gate high voltage may be applied to the 3m-1st gate line, and in a third scan period, a gate high voltage may be applied to the 3m-th gate line.

In the first scan period, any one sub pixel of the sub pixels of the first pixel may be sensed by the first reference voltage line, a sub pixel having a different color from the sub pixel of the first pixel connected to the 3m-2nd gate line, among sub pixels of the second pixel, may be sensed by the second reference voltage line, and a sub pixel having a different color from the sub pixel of the first pixel connected to the 3m-2nd gate line and the sub pixel of the second pixel connected to the 3m-2nd gate line, among sub pixels of the third pixel, may be sensed by the third reference voltage line.

In the second scan period, the other one sub pixel of the sub pixels of the first pixel may be sensed by the first reference voltage line, a sub pixel having a different color from the sub pixel of the first pixel connected to the 3m-1st gate line, among sub pixels of the second pixel, may be sensed by the second reference voltage line, and a sub pixel having a different color from the sub pixel of the first pixel connected to the 3m-1st gate line and the sub pixel of the second pixel connected to the 3m-1st gate line, among sub pixels of the third pixel, may be sensed by the third reference voltage line.

In the third scan period, another one sub pixel of the sub pixels of the first pixel may be sensed by the first reference voltage line, a sub pixel having a different color from the sub pixel of the first pixel connected to the 3m-th gate line, among sub pixels of the second pixel, may be sensed by the second reference voltage line, and a sub pixel having a different color from the sub pixel of the first pixel connected to the 3m-th gate line and the sub pixel of the second pixel connected to the 3m-th gate line, among sub pixels of the third pixel, may be sensed by the third reference voltage line.

The first reference voltage line may be disposed inside the first pixel, the second reference voltage line may be disposed inside the second pixel, and the third reference voltage line may be disposed inside the third pixel.

Each of the first sub pixels, the second sub pixels, and the third sub pixels may include a switching transistor, a driving transistor, a storage capacitor, a sensing transistor, and a light emitting diode and the sensing transistor outputs a voltage for sensing a threshold voltage and a mobility of the driving transistor to the first reference voltage line, the second reference voltage line, and the third reference voltage line.

According to another feature of the present disclosure, with respect to one row, any one of the plurality of first sub pixels disposed in the 16k-15th column, any one of the plurality of second sub pixels disposed in the 16k-14th column, any one of the plurality of third sub pixels disposed in the 16k-13th column, and any one of the plurality of fourth sub pixels disposed in the 16k-12th column configure a first pixel, any one of the plurality of first sub pixels disposed in the 16k-11th column, any one of the plurality of second sub pixels disposed in the 16k-10th column, any one of the plurality of third sub pixels disposed in the 16k-9th column, and any one of the plurality of fourth sub pixels disposed in the 16k-8th column configure a second pixel, any one of the plurality of first sub pixels disposed in the 16k-7th column, any one of the plurality of second sub pixels disposed in the 16k-6th column, any one of the plurality of third sub pixels disposed in the 16k-5th column, and any one of the plurality of fourth sub pixels disposed in the 16k-4th column configure a third pixel, and any one of the plurality of first sub pixels disposed in the 16k-3rd column, any one of the plurality of second sub pixels disposed in the 16k-2nd column, any one of the plurality of third sub pixels disposed in the 16k-1st column, and any one of the plurality of fourth sub pixels disposed in the 16k-th column configure a fourth pixel, in each of the first pixel, the second pixel, the third pixel, and the fourth pixel, a first sub pixel, a second sub pixel, a third sub pixel, and a fourth sub pixel are connected to different gate lines, a plurality of first sub pixels included in the first pixel, the second pixel, the third pixel, and the fourth pixel is connected to different gate lines each other, a plurality of second sub pixels included in the first pixel, the second pixel, the third pixel, and the fourth pixel is connected to different gate lines each other, a plurality of third sub pixels included in the first pixel, the second pixel, the third pixel, and the fourth pixel is connected to different gate lines each other, and a plurality of fourth sub pixels included in the first pixel, the second pixel, the third pixel, and the fourth pixel is connected to different gate lines each other.

With respect to one row, any one of the plurality of first sub pixels disposed in the 16k-15th column, any one of the plurality of second sub pixels disposed in the 16k-14th column, any one of the plurality of third sub pixels disposed in the 16k-13th column, and any one of the plurality of fourth sub pixels disposed in the 16k-12th column may configure a first pixel, any one of the plurality of first sub pixels disposed in the 16k-11th column, any one of the plurality of second sub pixels disposed in the 16k-10th column, any one of the plurality of third sub pixels disposed in the 16k-9th column, and any one of the plurality of fourth sub pixels disposed in the 16k-8th column may configure a second pixel, any one of the plurality of first sub pixels disposed in the 16k-7th column, any one of the plurality of second sub pixels disposed in the 16k-6th column, any one of the plurality of third sub pixels disposed in the 16k-5th column, and any one of the plurality of fourth sub pixels disposed in the 16k-4th column may configure a third pixel, and any one of the plurality of first sub pixels disposed in the 16k-3rd column, any one of the plurality of second sub pixels disposed in the 16k-2nd column, any one of the plurality of third sub pixels disposed in the 16k-1st column, and any one of the plurality of fourth sub pixels disposed in the 16k-th column may configure a fourth pixel.

In each of the first pixel, the second pixel, the third pixel, and the fourth pixel, a first sub pixel, a second sub pixel, a third sub pixel, and a fourth sub pixel may be connected to different gate lines each other, a plurality of first sub pixels included in the first pixel, the second pixel, the third pixel, and the fourth pixel may be connected to different gate lines each other, a plurality of second sub pixels included in the first pixel, the second pixel, the third pixel, and the fourth pixel may be connected to different gate lines each other, a plurality of third sub pixels included in the first pixel, the second pixel, the third pixel, and the fourth pixel may be connected to different gate lines each other, and a plurality of fourth sub pixels included in the first pixel, the second pixel, the third pixel, and the fourth pixel may be connected to different gate lines each other.

A 4m-3rd gate line is connected to any one sub pixel of the sub pixels of the first pixel, a sub pixel having a different color from the sub pixel of the first pixel connected to the 4m-3rd gate line, among sub pixels of the second pixel, a sub pixel having a different color from the sub pixel of the first pixel connected to the 4m-3rd gate line and the sub pixel of the second pixel connected to the 4m-3rd gate line, among sub pixels of the third pixel, and a sub pixel having a different color from the sub pixel of the first pixel connected to the 4m-3rd gate line, the sub pixel of the second pixel connected to the 4m-3rd gate line, and the sub pixel of the third pixel connected to the 4m-3rd gate line, among sub pixels of the fourth pixel (m is a natural number of 1 or larger).

A 4m-2nd gate line may be connected to the other one sub pixel of the sub pixels of the first pixel, a sub pixel having a different color from the sub pixel of the first pixel connected to the 4m-2nd gate line, among sub pixels of the second pixel, a sub pixel having a different color from the sub pixel of the first pixel connected to the 4m-2nd gate line and the sub pixel of the second pixel connected to the 4m-2nd gate line, among sub pixels of the third pixel, and a sub pixel having a different color from the sub pixel of the first pixel connected to the 4m-2nd gate line, the sub pixel of the second pixel connected to the 4m-2nd gate line, and the sub pixel of the third pixel connected to the 4m-2nd gate line, among sub pixels of the fourth pixel.

A 4m-1st gate line may be connected to another one sub pixel of the sub pixels of the first pixel, a sub pixel having a different color from the sub pixel of the first pixel connected to the 4m-1st gate line, among sub pixels of the second pixel, a sub pixel having a different color from the sub pixel of the first pixel connected to the 4m-1st gate line and the sub pixel of the second pixel connected to the 4m-1st gate line, among sub pixels of the third pixel, and a sub pixel having a different color from the sub pixel of the first pixel connected to the 4m-1st gate line, the sub pixel of the second pixel connected to the 4m-1st gate line, and the sub pixel of the third pixel connected to the 4m-1st gate line, among sub pixels of the fourth pixel.

A 4m-th gate line may be connected to the remaining one sub pixel of the sub pixels of the first pixel, a sub pixel having a different color from the sub pixel of the first pixel connected to the 4m-th gate line, among sub pixels of the second pixel, a sub pixel having a different color from the sub pixel of the first pixel connected to the 4m-th gate line and the sub pixel of the second pixel connected to the 4m-th gate line, among sub pixels of the third pixel, and a sub pixel having a different color from the sub pixel of the first pixel connected to the 4m-th gate line, the sub pixel of the second pixel connected to the 4m-th gate line, and the sub pixel of the third pixel connected to the 4m-th gate line, among sub pixels of the fourth pixel.

In a first scan period, a gate high voltage may be applied to the 4m-3rd gate line, in a second scan period, a gate high voltage may be applied to the 4m-2nd gate line, in a third scan period, a gate high voltage may be applied to the 4m-1st gate line, and in a fourth scan period, a gate high voltage is applied to the 4m-th gate line.

In the first scan period, any one sub pixel of the sub pixels of the first pixel may be sensed by the first reference voltage line, a sub pixel having a different color from the sub pixel of the first pixel connected to the 4m-3rd gate line, among sub pixels of the second pixel, is sensed by the second reference voltage line, a sub pixel having a different color from the sub pixel of the first pixel connected to the 4m-3rd gate line and the sub pixel of the second pixel connected to the 4m-3rd gate line, among sub pixels of the third pixel, may be sensed by the third reference voltage line, and a sub pixel having a different color from the sub pixel of the first pixel connected to the 4m-3rd gate line, the sub pixel of the second pixel connected to the 4m-3rd gate line, and the sub pixel of the third pixel connected to the 4m-3rd gate line, among sub pixels of the fourth pixel, may be sensed by the fourth reference voltage line.

In the second scan period, the other one sub pixel of the sub pixels of the first pixel may be sensed by the first reference voltage line, a sub pixel having a different color from the sub pixel of the first pixel connected to the 4m-2nd gate line, among sub pixels of the second pixel, may be sensed by the second reference voltage line, a sub pixel having a different color from the sub pixel of the first pixel connected to the 4m-2nd gate line and the sub pixel of the second pixel connected to the 4m-2nd gate line, among sub pixels of the third pixel, may be sensed by the third reference voltage line, and a sub pixel having a different color from the sub pixel of the first pixel connected to the 4m-2nd gate line, the sub pixel of the second pixel connected to the 4m-2nd gate line, and the sub pixel of the third pixel connected to the 4m-2nd gate line, among sub pixels of the fourth pixel, may be sensed by the fourth reference voltage line.

In the third scan period, another one sub pixel of the sub pixels of the first pixel may be sensed by the first reference voltage line, a sub pixel having a different color from the sub pixel of the first pixel connected to the 4m-1st gate line, among sub pixels of the second pixel, may be sensed by the second reference voltage line, a sub pixel having a different color from the sub pixel of the first pixel connected to the 4m-1st gate line and the sub pixel of the second pixel connected to the 4m-1st gate line, among sub pixels of the third pixel, may be sensed by the third reference voltage line, and a sub pixel having a different color from the sub pixel of the first pixel connected to the 4m-1st gate line, the sub pixel of the second pixel connected to the 4m-1st gate line, and the sub pixel of the third pixel connected to the 4m-1st gate line, among sub pixels of the fourth pixel, may be sensed by the fourth reference voltage line.

In the fourth scan period, the remaining one sub pixel of the sub pixels of the first pixel may be sensed by the first reference voltage line, a sub pixel having a different color from the sub pixel of the first pixel connected to the 4m-th gate line, among sub pixels of the second pixel, may be sensed by the second reference voltage line, a sub pixel having a different color from the sub pixel of the first pixel connected to the 4m-th gate line and the sub pixel of the second pixel connected to the 4m-th gate line, among sub pixels of the third pixel, may be sensed by the third reference voltage line, and a sub pixel having a different color from the sub pixel of the first pixel connected to the 4m-th gate line, the sub pixel of the second pixel connected to the 4m-th gate line, and the sub pixel of the third pixel connected to the 4m-th gate line, among sub pixels of the fourth pixel, may be sensed by the fourth reference voltage line.

The first reference voltage line may be disposed inside the first pixel, the second reference voltage line is disposed inside the second pixel, the third reference voltage line is disposed inside the third pixel, and the fourth reference voltage line may be disposed inside the fourth pixel.

Each of the first sub pixels, the second sub pixels, the third sub pixels, and the fourth sub pixels may include a switching transistor, a driving transistor, a storage capacitor, a sensing transistor, and a light emitting diode and the sensing transistor outputs a voltage for sensing a threshold voltage and a mobility of the driving transistor to the first reference voltage line, the second reference voltage line, the third reference voltage line, and the fourth reference voltage line.

According to yet another feature of the present disclosure, a display device comprising a display panel in which a plurality of pixels including a first sub pixel, a second sub pixel, a third sub pixel, and a fourth sub pixel each having a different color is disposed, a data driver configured to supply a data voltage to the plurality of pixels via a plurality of data lines using a sensing result of the plurality of pixels via a first reference voltage line, a second reference voltage line, and a third reference line; and a gate driver configured to supply a gate signal to the plurality of pixels via a plurality of gate lines, wherein a plurality of first sub pixels is disposed in a 12k-11th column, a 12k-7th column, and a 12k-3th column, a plurality of second sub pixels is disposed in a 12k-10th column, a 12k-6th column, and a 12k-2nd column, a plurality of third sub pixels is disposed in a 12k-9th column, a 12k-5th column, and a 12k-1st column, and a plurality of fourth sub pixels is disposed in a 12k-8th column, a 12k-4th column, and a 12k-th column, each of the plurality of data lines is branched into a plurality of sub data lines, each of the plurality of sub data lines is connected to a plurality of sub pixels having the same color, the first reference voltage line is connected to the plurality of first sub pixels disposed in the 12k-11th column, the plurality of second sub pixels disposed in the 12k-10th column, the plurality of third sub pixels disposed in the 12k-9th column, and the plurality of fourth sub pixels disposed in the 12k-8th column, the second reference voltage line is connected to the plurality of first sub pixels disposed in the 12k-7th column, the plurality of second sub pixels disposed in the 12k-6th column, the plurality of third sub pixels disposed in the 12k-5th column, and the plurality of fourth sub pixels disposed in the 12k-4th column, and the third reference voltage line is connected to the plurality of first sub pixels disposed in the 12k-3rd column, the plurality of second sub pixels disposed in the 12k-2nd column, the plurality of third sub pixels disposed in the 12k-1st column, and the plurality of fourth sub pixels disposed in the 12k-th column (k is a natural number of 1 or larger).

With respect to one row, any one of the plurality of first sub pixels disposed in the 12k-11th column, any one of the plurality of second sub pixels disposed in the 12k-10th column, any one of the plurality of third sub pixels disposed in the 12k-9th column, and any one of the plurality of fourth sub pixels disposed in the 12k-8th column may configure a first pixel, any one of the plurality of first sub pixels disposed in the 12k-7th column, any one of the plurality of second sub pixels disposed in the 12k-6th column, any one of the plurality of third sub pixels disposed in the 12k-5th column, and any one of the plurality of fourth sub pixels disposed in the 12k-4th column may configure a second pixel, and any one of the plurality of first sub pixels disposed in the 12k-3rd column, any one of the plurality of second sub pixels disposed in the 12k-2nd column, any one of the plurality of third sub pixels disposed in the 12k-1st column, and any one of the plurality of fourth sub pixels disposed in the 12k-th column may configure a third pixel.

Any one of a plurality of gate lines may be connected to a first sub pixel of the first pixel, a second sub pixel of the first pixel, a third sub pixel of the third pixel, and a fourth sub pixel of the third pixel, the other one of the plurality of gate lines may be connected to a third sub pixel of the first pixel, a fourth sub pixel of the first pixel, a first sub pixel of the second pixel, and a second sub pixel of the second pixel, and the remaining one of the plurality of gate lines may be connected to a third sub pixel of the second pixel, a fourth sub pixel of the second pixel, a first sub pixel of the second pixel, and a second sub pixel of the second pixel.

Any one of the plurality of gate lines may be connected to a first sub pixel of the first pixel, a second sub pixel of the second pixel, a third sub pixel of the second pixel, and a fourth sub pixel of the third pixel, the other one of the plurality of gate lines may be connected to a fourth sub pixel of the first pixel, a first sub pixel of the second pixel, a second sub pixel of the third pixel, and a third sub pixel of the third pixel, and the remaining one of the plurality of gate lines may be connected to a second sub pixel of the first pixel, a third sub pixel of the first pixel, a fourth sub pixel of the second pixel, and a first sub pixel of the third pixel.

The first reference voltage line may be disposed inside the first pixel, the second reference voltage line is disposed inside the second pixel, and the third reference voltage line may be disposed inside the third pixel.

Each of the first sub pixels, the second sub pixels, the third sub pixels, and the fourth sub pixels may include a switching transistor, a driving transistor, a storage capacitor, a sensing transistor, and a light emitting diode and the sensing transistor may output a voltage for sensing a threshold voltage and a mobility of the driving transistor to the first reference voltage line, the second reference voltage line, and the third reference voltage line.

Further examples of the embodiments are detailed below:

One embodiment of the present disclosure includes a display device, which may be summarized as including a display panel in which a plurality of pixels including a first sub pixel, a second sub pixel, and a third sub pixel each having a different color is disposed; a data driver configured to supply a data voltage to the plurality of pixels via a plurality of data lines using a sensing result of the plurality of pixels via a first reference voltage line, a second reference voltage line, and a third reference line; and a gate driver configured to supply a gate signal to the plurality of pixels via a plurality of gate lines, wherein the plurality of first sub pixels is disposed in a 9k-8th column, a 9k-5th column, and a 9k-2nd column, the plurality of second sub pixels is disposed in a 9k-7th column, a 9k-4th column, and a 9k-1st column, the plurality of third sub pixels is disposed in a 9k-6th column, a 9k-3rd column, and a 9k-th column, each of the plurality of data lines is branched into a plurality of sub data lines, each of the plurality of sub data lines is connected to a plurality of sub pixels having the same color, the first reference voltage line is connected to the plurality of first sub pixels disposed in the 9k-8th column, the plurality of second sub pixels disposed in the 9k-7th column, and the plurality of third sub pixels disposed in the 9k-6th column, the second reference voltage line is connected to the plurality of first sub pixels disposed in the 9k-5th column, the plurality of second sub pixels disposed in the 9k-4th column, and the plurality of third sub pixels disposed in the 9k-3rd column, and the third reference voltage line is connected to the plurality of first sub pixels disposed in the 9k-2nd column, the plurality of second sub pixels disposed in the 9k-1st column, and the plurality of third sub pixels disposed in the 9k-th column (k is a natural number of 1 or larger).

With respect to one row, any one of the plurality of first sub pixels disposed in the 9k-8th column, any one of the plurality of second sub pixels disposed in the 9k-7th column, and any one of the plurality of third sub pixels disposed in the 9k-6th column may configure a first pixel, any one of the plurality of first sub pixels disposed in the 9k-5th column, any one of the plurality of second sub pixels disposed in the 9k-4th column, and any one of the plurality of third sub pixels disposed in the 9k-3rd column may configure a second pixel, any one of the plurality of first sub pixels disposed in the 9k-2nd column, any one of the plurality of second sub pixels disposed in the 9k-1st column, and any one of the plurality of third sub pixels disposed in the 9k-th column may configure a third pixel, in each of the first pixel, the second pixel, and the third pixel, the first sub pixel, the second sub pixel, and the third sub pixel may be connected to different gate lines each other, a plurality of first sub pixels included in the first pixel, the second pixel, and the third pixel may be connected to different gate lines each other, a plurality of second sub pixels included in the first pixel, the second pixel, and the third pixel may be connected to different gate lines each other, and a plurality of third sub pixels included in the first pixel, the second pixel, and the third pixel may be connected to different gate lines each other.

A 3m-2nd gate line may be connected to any one sub pixel of the sub pixels of the first pixel, a sub pixel having a different color from the sub pixel of the first pixel connected to the 3m-2nd gate line, among sub pixels of the second pixel, and a sub pixel having a different color from the sub pixel of the first pixel connected to the 3m-2nd gate line and the sub pixel of the second pixel connected to the 3m-2nd gate line, among sub pixels of the third pixel (m is a natural number of 1 or larger).

A 3m-1st gate line may be connected to the other one sub pixel of the sub pixels of the first pixel, a sub pixel having a different color from the sub pixel of the first pixel connected to the 3m-1st gate line, among sub pixels of the second pixel, and a sub pixel having a different color from the sub pixel of the first pixel connected to the 3m-1st gate line and the sub pixel of the second pixel connected to the 3m-1st gate line, among sub pixels of the third pixel.

A 3m-th gate line may be connected to another one sub pixel of the sub pixels of the first pixel, a sub pixel having a different color from the sub pixel of the first pixel connected to the 3m-th gate line, among sub pixels of the second pixel, and a sub pixel having a different color from the sub pixel of the first pixel connected to the 3m-th gate line and the sub pixel of the second pixel connected to the 3m-th gate line, among sub pixels of the third pixel.

In a first scan period, a gate high voltage may be applied to the 3m-2nd gate line, in a second scan period, a gate high voltage may be applied to the 3m-1st gate line, and in a third scan period, a gate high voltage may be applied to the 3m-th gate line.

In the first scan period, any one sub pixel of the sub pixels of the first pixel may be sensed by the first reference voltage line, a sub pixel having a different color from the sub pixel of the first pixel connected to the 3m-2nd gate line, among sub pixels of the second pixel, may be sensed by the second reference voltage line, and a sub pixel having a different color from the sub pixel of the first pixel connected to the 3m-2nd gate line and the sub pixel of the second pixel connected to the 3m-2nd gate line, among sub pixels of the third pixel, may be sensed by the third reference voltage line.

In the second scan period, the other one sub pixel of the sub pixels of the first pixel may be sensed by the first reference voltage line, a sub pixel having a different color from the sub pixel of the first pixel connected to the 3m-1st gate line, among sub pixels of the second pixel, may be sensed by the second reference voltage line, and a sub pixel having a different color from the sub pixel of the first pixel connected to the 3m-1st gate line and the sub pixel of the second pixel connected to the 3m-1st gate line, among sub pixels of the third pixel, may be sensed by the third reference voltage line.

In the third scan period, another one sub pixel of the sub pixels of the first pixel may be sensed by the first reference voltage line, a sub pixel having a different color from the sub pixel of the first pixel connected to the 3m-th gate line, among sub pixels of the second pixel, may be sensed by the second reference voltage line, and a sub pixel having a different color from the sub pixel of the first pixel connected to the 3m-th gate line and the sub pixel of the second pixel connected to the 3m-th gate line, among sub pixels of the third pixel, may be sensed by the third reference voltage line.

The first reference voltage line may be disposed inside the first pixel, the second reference voltage line may be disposed inside the second pixel, and the third reference voltage line may be disposed inside the third pixel.

Each of the first sub pixels, the second sub pixels, and the third sub pixels may include a switching transistor, a driving transistor, a storage capacitor, a sensing transistor, and a light emitting diode and the sensing transistor outputs a voltage for sensing a threshold voltage and a mobility of the driving transistor to the first reference voltage line, the second reference voltage line, and the third reference voltage line.

Another embodiment of the present disclosure includes a display device, which may be summarized as including a display panel in which a plurality of pixels including a first sub pixel, a second sub pixel, a third sub pixel, and a fourth sub pixel each having a different color is disposed; a data driver configured to supply a data voltage to the plurality of pixels via a plurality of data lines using a sensing result of the plurality of pixels via a first reference voltage line, a second reference voltage line, a third reference line, and a fourth reference line; and a gate driver configured to supply a gate signal to the plurality of pixels via a plurality of gate lines, wherein a plurality of first sub pixels is disposed in a 16k-15th column, a 16k-11th column, a 16k-7th column, and a 16k-3rd column, a plurality of second sub pixels is disposed in a 16k-14th column, a 16k-10th column, a 16k-6th column, and a 16k-2nd column, a plurality of third sub pixels is disposed in a 16k-13th column, a 16k-9th column, a 16k-5th column, and a 16k-1st column, and a plurality of fourth sub pixels is disposed in a 16k-12th column, a 16k-8th column, a 16k-4th column, and a 16k-th column, each of the plurality of data lines is branched into a plurality of sub data lines, each of the plurality of sub data lines is connected to a plurality of sub pixels having the same color, the first reference voltage line is connected to the plurality of first sub pixels disposed in the 16k-15th column, the plurality of second sub pixels disposed in the 16k-14th column, the plurality of third sub pixels disposed in the 16k-13th column, and the plurality of fourth sub pixels disposed in the 16k-12th column, the second reference voltage line is connected to the plurality of first sub pixels disposed in the 16k-11th column, the plurality of second sub pixels disposed in the 16k-10th column, the plurality of third sub pixels disposed in the 16k-9th column, and the plurality of fourth sub pixels disposed in the 16k-8th column, the third reference voltage line is connected to the plurality of first sub pixels disposed in the 16k-7th column, the plurality of second sub pixels disposed in the 16k-6th column, the plurality of third sub pixels disposed in the 16k-5th column, and the plurality of fourth sub pixels disposed in the 16k-4th column, and the fourth reference voltage line is connected to the plurality of first sub pixels disposed in the 16k-3rd column, the plurality of second sub pixels disposed in the 16k-2nd column, the plurality of third sub pixels disposed in the 16k-1st column, and the plurality of fourth sub pixels disposed in the 16k-th column (k is a natural number of 1 or larger).

With respect to one row, any one of the plurality of first sub pixels disposed in the 16k-15th column, any one of the plurality of second sub pixels disposed in the 16k-14th column, any one of the plurality of third sub pixels disposed in the 16k-13th column, and any one of the plurality of fourth sub pixels disposed in the 16k-12th column may configure a first pixel, any one of the plurality of first sub pixels disposed in the 16k-11th column, any one of the plurality of second sub pixels disposed in the 16k-10th column, any one of the plurality of third sub pixels disposed in the 16k-9th column, and any one of the plurality of fourth sub pixels disposed in the 16k-8th column may configure a second pixel, any one of the plurality of first sub pixels disposed in the 16k-7th column, any one of the plurality of second sub pixels disposed in the 16k-6th column, any one of the plurality of third sub pixels disposed in the 16k-5th column, and any one of the plurality of fourth sub pixels disposed in the 16k-4th column may configure a third pixel, and any one of the plurality of first sub pixels disposed in the 16k-3rd column, any one of the plurality of second sub pixels disposed in the 16k-2nd column, any one of the plurality of third sub pixels disposed in the 16k-1st column, and any one of the plurality of fourth sub pixels disposed in the 16k-th column may configure a fourth pixel, in each of the first pixel, the second pixel, the third pixel, and the fourth pixel, a first sub pixel, a second sub pixel, a third sub pixel, and a fourth sub pixel may be connected to different gate lines each other, a plurality of first sub pixels included in the first pixel, the second pixel, the third pixel, and the fourth pixel may be connected to different gate lines each other, a plurality of second sub pixels included in the first pixel, the second pixel, the third pixel, and the fourth pixel may be connected to different gate lines each other, a plurality of third sub pixels included in the first pixel, the second pixel, the third pixel, and the fourth pixel may be connected to different gate lines each other, and a plurality of fourth sub pixels included in the first pixel, the second pixel, the third pixel, and the fourth pixel may be connected to different gate lines each other.

A 4m-3rd gate line may be connected to any one sub pixel of the sub pixels of the first pixel, a sub pixel having a different color from the sub pixel of the first pixel connected to the 4m-3rd gate line, among sub pixels of the second pixel, a sub pixel having a different color from the sub pixel of the first pixel connected to the 4m-3rd gate line, and the sub pixel of the second pixel connected to the 4m-3rd gate line, among sub pixels of the third pixel, and a sub pixel having a different color from the sub pixel of the first pixel connected to the 4m-3rd gate line, the sub pixel of the second pixel connected to the 4m-3rd gate line, and the sub pixel of the third pixel connected to the 4m-3rd gate line, among sub pixels of the fourth pixel (m is a natural number of 1 or larger).

A 4m-2nd gate line may be connected to the other one sub pixel of the sub pixels of the first pixel, a sub pixel having a different color from the sub pixel of the first pixel connected to the 4m-2nd gate line, among sub pixels of the second pixel, a sub pixel having a different color from the sub pixel of the first pixel connected to the 4m-2nd gate line and the sub pixel of the second pixel connected to the 4m-2nd gate line, among sub pixels of the third pixel, and a sub pixel having a different color from the sub pixel of the first pixel connected to the 4m-2nd gate line, the sub pixel of the second pixel connected to the 4m-2nd gate line, and the sub pixel of the third pixel connected to the 4m-2nd gate line, among sub pixels of the fourth pixel.

A 4m-1st gate line may be connected to another one sub pixel of the sub pixels of the first pixel, a sub pixel having a different color from the sub pixel of the first pixel connected to the 4m-1st gate line, among sub pixels of the second pixel, a sub pixel having a different color from the sub pixel of the first pixel connected to the 4m-1st gate line and the sub pixel of the second pixel connected to the 4m-1st gate line, among sub pixels of the third pixel, and a sub pixel having a different color from the sub pixel of the first pixel connected to the 4m-1st gate line, the sub pixel of the second pixel connected to the 4m-1st gate line, and the sub pixel of the third pixel connected to the 4m-1st gate line, among sub pixels of the fourth pixel.

A 4m-th gate line may be connected to the remaining one sub pixel of the sub pixels of the first pixel, a sub pixel having a different color from the sub pixel of the first pixel connected to the 4m-th gate line, among sub pixels of the second pixel, a sub pixel having a different color from the sub pixel of the first pixel connected to the 4m-th gate line and the sub pixel of the second pixel connected to the 4m-th gate line, among sub pixels of the third pixel, and a sub pixel having a different color from the sub pixel of the first pixel connected to the 4m-th gate line, the sub pixel of the second pixel connected to the 4m-th gate line, and the sub pixel of the third pixel connected to the 4m-th gate line, among sub pixels of the fourth pixel.

In a first scan period, a gate high voltage may be applied to the 4m-3rd gate line, in a second scan period, a gate high voltage may be applied to the 4m-2nd gate line, in a third scan period, a gate high voltage may be applied to the 4m-1st gate line, and in a fourth scan period, a gate high voltage may be applied to the 4m-th gate line.

In the first scan period, any one sub pixel of the sub pixels of the first pixel may be sensed by the first reference voltage line, a sub pixel having a different color from the sub pixel of the first pixel connected to the 4m-3rd gate line, among sub pixels of the second pixel, may be sensed by the second reference voltage line, a sub pixel having a different color from the sub pixel of the first pixel connected to the 4m-3rd gate line and the sub pixel of the second pixel connected to the 4m-3rd gate line, among sub pixels of the third pixel, may be sensed by the third reference voltage line, and a sub pixel having a different color from the sub pixel of the first pixel connected to the 4m-3rd gate line, the sub pixel of the second pixel connected to the 4m-3rd gate line, and the sub pixel of the third pixel connected to the 4m-3rd gate line, among sub pixels of the fourth pixel, may be sensed by the fourth reference voltage line.

In the second scan period, the other one sub pixel of the sub pixels of the first pixel may be sensed by the first reference voltage line, a sub pixel having a different color from the sub pixel of the first pixel connected to the 4m-2nd gate line, among sub pixels of the second pixel, may be sensed by the second reference voltage line, a sub pixel having a different color from the sub pixel of the first pixel connected to the 4m-2nd gate line and the sub pixel of the second pixel connected to the 4m-2nd gate line, among sub pixels of the third pixel, may be sensed by the third reference voltage line, and a sub pixel having a different color from the sub pixel of the first pixel connected to the 4m-2nd gate line, the sub pixel of the second pixel connected to the 4m-2nd gate line, and the sub pixel of the third pixel connected to the 4m-2nd gate line, among sub pixels of the fourth pixel, may be sensed by the fourth reference voltage line.

In the third scan period, another one sub pixel of the sub pixels of the first pixel may be sensed by the first reference voltage line, a sub pixel having a different color from the sub pixel of the first pixel connected to the 4m-1st gate line, among sub pixels of the second pixel, may be sensed by the second reference voltage line, a sub pixel having a different color from the sub pixel of the first pixel connected to the 4m-1st gate line and the sub pixel of the second pixel connected to the 4m-1st gate line, among sub pixels of the third pixel, may be sensed by the third reference voltage line, and a sub pixel having a different color from the sub pixel of the first pixel connected to the 4m-1st gate line, the sub pixel of the second pixel connected to the 4m-1st gate line, and the sub pixel of the third pixel connected to the 4m-1st gate line, among sub pixels of the fourth pixel, may be sensed by the fourth reference voltage line.

In the fourth scan period, the remaining one sub pixel of the sub pixels of the first pixel may be sensed by the first reference voltage line, a sub pixel having a different color from the sub pixel of the first pixel connected to the 4m-th gate line, among sub pixels of the second pixel, may be sensed by the second reference voltage line, a sub pixel having a different color from the sub pixel of the first pixel connected to the 4m-th gate line and the sub pixel of the second pixel connected to the 4m-th gate line, among sub pixels of the third pixel, may be sensed by the third reference voltage line, and a sub pixel having a different color from the sub pixel of the first pixel connected to the 4m-th gate line, the sub pixel of the second pixel connected to the 4m-th gate line, and the sub pixel of the third pixel connected to the 4m-th gate line, among sub pixels of the fourth pixel, may be sensed by the fourth reference voltage line.

The first reference voltage line may be disposed inside the first pixel, the second reference voltage line may be disposed inside the second pixel, the third reference voltage line may be disposed inside the third pixel, and the fourth reference voltage line may be disposed inside the fourth pixel.

Each of the first sub pixels, the second sub pixels, the third sub pixels, and the fourth sub pixels may include a switching transistor, a driving transistor, a storage capacitor, a sensing transistor, and a light emitting diode and the sensing transistor may output a voltage for sensing a threshold voltage and a mobility of the driving transistor to the first reference voltage line, the second reference voltage line, the third reference voltage line, and the fourth reference voltage line.

Another embodiment of the present disclosure includes a display device, which may be summarized as including a display panel in which a plurality of pixels including a first sub pixel, a second sub pixel, a third sub pixel, and a fourth sub pixel each having a different color is disposed; a data driver configured to supply a data voltage to the plurality of pixels via a plurality of data lines using a sensing result of the plurality of pixels via a first reference voltage line, a second reference voltage line, and a third reference line; and a gate driver configured to supply a gate signal to the plurality of pixels via a plurality of gate lines, wherein a plurality of first sub pixels is disposed in a 12k-11th column, a 12k-7th column, and a 12k-3th column, a plurality of second sub pixels is disposed in a 12k-10th column, a 12k-6th column, and a 12k-2nd column, a plurality of third sub pixels is disposed in a 12k-9th column, a 12k-5th column, and a 12k-1st column, and a plurality of fourth sub pixels is disposed in a 12k-8th column, a 12k-4th column, and a 12k-th column, each of the plurality of data lines is branched into a plurality of sub data lines, each of the plurality of sub data lines is connected to a plurality of sub pixels having the same color, the first reference voltage line is connected to the plurality of first sub pixels disposed in the 12k-11th column, the plurality of second sub pixels disposed in the 12k-10th column, the plurality of third sub pixels disposed in the 12k-9th column, and the plurality of fourth sub pixels disposed in the 12k-8th column, the second reference voltage line is connected to the plurality of first sub pixels disposed in the 12k-7th column, the plurality of second sub pixels disposed in the 12k-6th column, the plurality of third sub pixels disposed in the 12k-5th column, and the plurality of fourth sub pixels disposed in the 12k-4th column, and the third reference voltage line is connected to the plurality of first sub pixels disposed in the 12k-3rd column, the plurality of second sub pixels disposed in the 12k-2nd column, the plurality of third sub pixels disposed in the 12k-1st column, and the plurality of fourth sub pixels disposed in the 12k-th column (k is a natural number of 1 or larger).

With respect to one row, any one of the plurality of first sub pixels disposed in the 12k-11th column, any one of the plurality of second sub pixels disposed in the 12k-10th column, any one of the plurality of third sub pixels disposed in the 12k-9th column, and any one of the plurality of fourth sub pixels disposed in the 12k-8th column may configure a first pixel, any one of the plurality of first sub pixels disposed in the 12k-7th column, any one of the plurality of second sub pixels disposed in the 12k-6th column, any one of the plurality of third sub pixels disposed in the 12k-5th column, and any one of the plurality of fourth sub pixels disposed in the 12k-4th column may configure a second pixel, and any one of the plurality of first sub pixels disposed in the 12k-3rd column, any one of the plurality of second sub pixels disposed in the 12k-2nd column, any one of the plurality of third sub pixels disposed in the 12k-1st column, and any one of the plurality of fourth sub pixels disposed in the 12k-th column may configure a third pixel.

Any one of a plurality of gate lines may be connected to a first sub pixel of the first pixel, a second sub pixel of the first pixel, a third sub pixel of the third pixel, and a fourth sub pixel of the third pixel, the other one of the plurality of gate lines may be connected to a third sub pixel of the first pixel, a fourth sub pixel of the first pixel, a first sub pixel of the second pixel, and a second sub pixel of the second pixel, and the remaining one of the plurality of gate lines may be connected to a third sub pixel of the second pixel, a fourth sub pixel of the second pixel, a first sub pixel of the second pixel, and a second sub pixel of the second pixel.

Any one of the plurality of gate lines may be connected to a first sub pixel of the first pixel, a second sub pixel of the second pixel, a third sub pixel of the second pixel, and a fourth sub pixel of the third pixel, the other one of the plurality of gate lines may be connected to a fourth sub pixel of the first pixel, a first sub pixel of the second pixel, a second sub pixel of the third pixel, and a third sub pixel of the third pixel, and the remaining one of the plurality of gate lines may be connected to a second sub pixel of the first pixel, a third sub pixel of the first pixel, a fourth sub pixel of the second pixel, and a first sub pixel of the third pixel.

The first reference voltage line may be disposed inside the first pixel, the second reference voltage line may be disposed inside the second pixel, and the third reference voltage line may be disposed inside the third pixel.

Each of the first sub pixels, the second sub pixels, the third sub pixels, and the fourth sub pixels may include a switching transistor, a driving transistor, a storage capacitor, a sensing transistor, and a light emitting diode and the sensing transistor outputs a voltage for sensing a threshold voltage and a mobility of the driving transistor to the first reference voltage line, the second reference voltage line, and the third reference voltage line.

Another embodiment of the present disclosure includes a display device, which may be summarized as including a display panel including a plurality of pixel units each including N pixels; a data driver configured to supply a data voltage to the N pixels via N data lines using a sensing result of the N pixels via N reference lines; and a gate driver configured to supply a gate signal to the N pixels via N gate lines, wherein each of the N pixels including N sub pixel each having a different color; wherein each of the N data lines is branched into N sub data lines, wherein each of the N sub data lines is connected to sub pixels having the same color, wherein each of the N gate lines are connected to all of the N pixels and connected to sub pixels having a different color (N is a natural number of 1 or larger).

Another embodiment of the present disclosure includes a display device, which may be summarized as including a display panel in which a plurality of pixels including a first sub pixel, a second sub pixel, a third sub pixel, and a fourth sub pixel each having a different color is disposed; a data driver configured to supply a data voltage to the plurality of pixels via a plurality of data lines using a sensing result of the plurality of pixels via a first reference voltage line, a second reference voltage line, and a third reference line; and a gate driver configured to supply a gate signal to the plurality of pixels via a plurality of gate lines, wherein each of the plurality of data lines is branched into a plurality of sub data lines, wherein each of the plurality of sub data lines is connected to a plurality of sub pixels having the same color, and wherein each of the plurality of the gate lines are connected to 4 sub pixels disposed sequentially in a row.

Another embodiment of the present disclosure includes a display device, which may be summarized as including a display panel in which a plurality of pixels including a first sub pixel, a second sub pixel, a third sub pixel, and a fourth sub pixel disposed sequentially in a row and each having a different color is disposed; a data driver configured to supply a data voltage to the plurality of pixels via a plurality of data lines using a sensing result of the plurality of pixels via a first reference voltage line, a second reference voltage line, and a third reference line; and a gate driver configured to supply a gate signal to the plurality of pixels via a plurality of gate lines, wherein each of the plurality of data lines is branched into a plurality of sub data lines, wherein each of the plurality of sub data lines is connected to a plurality of sub pixels having the same color, wherein a first sub pixel of one pixel of the plurality of pixels and a fourth sub pixel of adjacent pixel of the plurality of pixels are connected to same gate line, and wherein a second sub pixel and third sub pixel of one pixel of the plurality of pixels are connected to same gate line.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:

a display panel having a plurality of pixel units each including N pixels, the N pixels including a first pixel, a second pixel, and a third pixel;

a data driver configured to supply a data voltage to the N pixels via N data lines using a sensing result of the N pixels via N reference voltage lines; and a gate driver configured to supply a gate signal to the N pixels via N gate lines, wherein each of the N pixels including sub pixels each having a different color, the sub pixels including a first sub pixel of a first color, a second sub pixel of a second color, and a third sub pixel of a third color;

wherein each of the N data lines is branched into sub data lines, wherein each of the sub data lines is connected to sub pixels having the same color, wherein each of the N gate lines are connected to all of the N pixels and connected to at least two different sub pixels having a different color from each other within a single pixel, wherein N is a natural number of 1 or larger, wherein in each of the first pixel, the second pixel, and the third pixel, the first sub pixel, the second sub pixel, and the third sub pixel are connected to different gate lines from each other, wherein a plurality of first sub pixels included in the first pixel, the second pixel, and the third pixel is connected to different gate lines from each other, wherein a plurality of second sub pixels included in the first pixel, the second pixel, and the third pixel is connected to different gate lines rom each other, and wherein a plurality of third sub pixels included in the first pixel, the second pixel, and the third pixel is connected to different gate lines from each other.

2. The display device according to claim 1, wherein with respect to one row, the pixel units each including 3 pixels, and each of the 3 pixels includes a first sub pixel, a second sub pixel, and a third sub pixel each having a different color;

wherein the N reference voltage lines includes a first reference voltage line, a second reference voltage line, and a third reference voltage line; and wherein each of the N reference voltage lines is connected to the first sub pixel, the second sub pixel, and the third sub pixel in each pixel.

3. The display device according to claim 2, wherein the N gate lines includes a first gate line, a second gate line, and a third gate line; and wherein the first gate line is connected to any one sub pixel of the sub pixels of the first pixel, wherein the first gate line is connected to a sub pixel having a different color from the sub pixel of the first pixel connected to the first gate line, among sub pixels of the second pixel, and wherein the first gate line is connected to a sub pixel having a different color from the sub pixel of the first pixel connected to the first gate line and the sub pixel of the second pixel connected to the first gate line, among sub pixels of the third pixel; and wherein the second gate line is connected to the other one sub pixel of the sub pixels of the first pixel, wherein the second gate line is connected to a sub pixel having a different color from the sub pixel of the first pixel connected to the second gate line, among sub pixels of the second pixel, and wherein the second gate line is connected to a sub pixel having a different color from the sub pixel of the first pixel connected to the second gate line and the sub pixel of the second pixel connected to the second gate line, among sub pixels of the third pixel; and wherein the third gate line is connected to another one sub pixel of the sub pixels of the first pixel, wherein the third gate line is connected to a sub pixel having a different color from the sub pixel of the first pixel connected to the third gate line, among sub pixels of the second pixel, and wherein the third gate line is connected to a sub pixel having a different color from the sub pixel of the first pixel connected to the third gate line and the sub pixel of the second pixel connected to the third gate line, among sub pixels of the third pixel.

4. A sensing method of the display device according claim 3, wherein in a first scan period, a gate high voltage is applied to the first gate line, in a second scan period, a gate high voltage is applied to the second gate line, and in a third scan period, a gate high voltage is applied to the third gate line.

5. The sensing method according to claim 4, wherein in the first scan period, any one sub pixel of the sub pixels of the first pixel connected to the first gate line is sensed by the first reference voltage line, a sub pixel having a different color from the sub pixel of the first pixel connected to the first gate line, among sub pixels of the second pixel, is sensed by the second reference voltage line, and a sub pixel having a different color from the sub pixel of the first pixel connected to the first gate line and the sub pixel of the second pixel connected to the first gate line, among sub pixels of the third pixel, is sensed by the third reference voltage line;

wherein in the second scan period, the other one sub pixel of the sub pixels of the first pixel connected to the second gate line is sensed by the first reference voltage line, a sub pixel having a different color from the sub pixel of the first pixel connected to the second gate line, among sub pixels of the second pixel, is sensed by the second reference voltage line, and a sub pixel having a different color from the sub pixel of the first pixel connected to the second gate line and the sub pixel of the second pixel connected to the second gate line, among sub pixels of the third pixel, is sensed by the third reference voltage line;

wherein in the third scan period, another one sub pixel of the sub pixels of the first pixel connected to the third gate line is sensed by the first reference voltage line, a sub pixel having a different color from the sub pixel of the first pixel connected to the third gate line, among sub pixels of the second pixel, is sensed by the second reference voltage line, and a sub pixel having a different color from the sub pixel of the first pixel connected to the third gate line and the sub pixel of the second pixel connected to the third gate line, among sub pixels of the third pixel, is sensed by the third reference voltage line.

6. The sensing method according to claim 5, wherein each of the sub pixels includes:

a switching transistor, a driving transistor, a storage capacitor, a sensing transistor, and a light emitting diode; and wherein the sensing transistor outputs a voltage for sensing a threshold voltage and a mobility of the driving transistor to the N reference voltage lines.

7. The display device according to claim 1, wherein with respect to one row, the pixel units each including 4 pixels, and each of the 4 pixels includes a first sub pixel, a second sub pixel, a third sub pixel, and a fourth sub pixel, each sub pixel having a different color;

wherein the N reference voltage lines includes the first reference voltage line, the second reference voltage line, the third reference voltage line, and a fourth reference voltage line; and wherein each of the N reference voltage line is connected to the first sub pixel, the second sub pixel, the third sub pixel, and the fourth sub pixel in each pixel.

8. The display device according to claim 7, wherein the pixel units includes a first pixel, a second pixel, a third pixel, and a fourth pixel, and each pixel includes the first sub pixel, the second sub pixel, the third sub pixel, and the fourth sub pixel disposed sequentially in a row;

in each of the first pixel, the second pixel, the third pixel, and the fourth pixel, the first sub pixel, the second sub pixel, the third sub pixel, and the fourth sub pixel are connected to different gate lines each other, a plurality of first sub pixels included in the first pixel, the second pixel, the third pixel, and the fourth pixel is connected to different gate lines each other, a plurality of second sub pixels included in the first pixel, the second pixel, the third pixel, and the fourth pixel is connected to different gate lines each other, a plurality of third sub pixels included in the first pixel, the second pixel, the third pixel, and the fourth pixel is connected to different gate lines each other, and a plurality of fourth sub pixels included in the first pixel, the second pixel, the third pixel, and the fourth pixel is connected to different gate lines each other.

9. The display device according to claim 8, wherein the N gate lines includes a first gate line, a second gate line, a third gate line and a fourth gate line; and wherein the first gate line is connected to any one sub pixel of the sub pixels of the first pixel, a sub pixel having a different color from the sub pixel of the first pixel connected to the first gate line, among sub pixels of the second pixel, a sub pixel having a different color from the sub pixel of the first pixel connected to the first gate line and the sub pixel of the second pixel connected to the first gate line, among sub pixels of the third pixel, and a sub pixel having a different color from the sub pixel of the first pixel connected to the first gate line, the sub pixel of the second pixel connected to the first gate line, and the sub pixel of the third pixel connected to the first gate line, among sub pixels of the fourth pixel, wherein m is a natural number of 1 or larger; and wherein the second gate line is connected to the other one sub pixel of the sub pixels of the first pixel, a sub pixel having a different color from the sub pixel of the first pixel connected to the second gate line, among sub pixels of the second pixel, a sub pixel having a different color from the sub pixel of the first pixel connected to the second gate line and the sub pixel of the second pixel connected to the second gate line, among sub pixels of the third pixel, and a sub pixel having a different color from the sub pixel of the first pixel connected to the second gate line, the sub pixel of the second pixel connected to the second gate line, and the sub pixel of the third pixel connected to the second gate line, among sub pixels of the fourth pixel; and wherein the third gate line is connected to another one sub pixel of the sub pixels of the first pixel, a sub pixel having a different color from the sub pixel of the first pixel connected to the third gate line, among sub pixels of the second pixel, a sub pixel having a different color from the sub pixel of the first pixel connected to the third gate line and the sub pixel of the second pixel connected to the third gate line, among sub pixels of the third pixel, and a sub pixel having a different color from the sub pixel of the first pixel connected to the third gate line, the sub pixel of the second pixel connected to the third gate line, and the sub pixel of the third pixel connected to the third gate line, among sub pixels of the fourth pixel; and wherein the fourth gate line is connected to the remaining one sub pixel of the sub pixels of the first pixel, a sub pixel having a different color from the sub pixel of the first pixel connected to the fourth gate line, among sub pixels of the second pixel, a sub pixel having a different color from the sub pixel of the first pixel connected to the fourth gate line and the sub pixel of the second pixel connected to the fourth gate line, among sub pixels of the third pixel, and a sub pixel having a different color from the sub pixel of the first pixel connected to the fourth gate line, the sub pixel of the second pixel connected to the fourth gate line, and the sub pixel of the third pixel connected to the fourth gate line, among sub pixels of the fourth pixel.

10. A sensing method of the display device according to claim 9, wherein in a first scan period, a gate high voltage is applied to the first gate line, in a second scan period, a gate high voltage is applied to the second gate line, in a third scan period, a gate high voltage is applied to the third gate line, and in a fourth scan period, a gate high voltage is applied to the fourth gate line.

11. The display device sensing method according to claim 9, wherein in the first scan period, any one sub pixel of the sub pixels of the first pixel connected to the first gate line is sensed by the first reference voltage line, a sub pixel having a different color from the sub pixel of the first pixel connected to the first gate line, among sub pixels of the second pixel, is sensed by the second reference voltage line, a sub pixel having a different color from the sub pixel of the first pixel connected to the first gate line and the sub pixel of the second pixel connected to the first gate line, among sub pixels of the third pixel, is sensed by the third reference voltage line, and a sub pixel having a different color from the sub pixel of the first pixel connected to the first gate line, the sub pixel of the second pixel connected to the first gate line, and the sub pixel of the third pixel connected to the first gate line, among sub pixels of the fourth pixel, is sensed by the fourth reference voltage line;

wherein in the second scan period, the other one sub pixel of the sub pixels of the first pixel connected to the second gate line is sensed by the first reference voltage line, a sub pixel having a different color from the sub pixel of the first pixel connected to the second gate line, among sub pixels of the second pixel, is sensed by the second reference voltage line, a sub pixel having a different color from the sub pixel of the first pixel connected to the second gate line and the sub pixel of the second pixel connected to the second gate line, among sub pixels of the third pixel, is sensed by the third reference voltage line, and a sub pixel having a different color from the sub pixel of the first pixel connected to the second gate line, the sub pixel of the second pixel connected to the second gate line, and the sub pixel of the third pixel connected to the second gate line, among sub pixels of the fourth pixel, is sensed by the fourth reference voltage line, wherein in the third scan period, another one sub pixel of the sub pixels of the first pixel connected to the third gate line is sensed by the first reference voltage line, a sub pixel having a different color from the sub pixel of the first pixel connected to the third gate line, among sub pixels of the second pixel, is sensed by the second reference voltage line, a sub pixel having a different color from the sub pixel of the first pixel connected to the third gate line and the sub pixel of the second pixel connected to the third gate line, among sub pixels of the third pixel, is sensed by the third reference voltage line, and a sub pixel having a different color from the sub pixel of the first pixel connected to the third gate line, the sub pixel of the second pixel connected to the third gate line, and the sub pixel of the third pixel connected to the third gate line, among sub pixels of the fourth pixel, is sensed by the fourth reference voltage line;

wherein in the fourth scan period, the remaining one sub pixel of the sub pixels of the first pixel connected to the fourth gate line is sensed by the first reference voltage line, a sub pixel having a different color from the sub pixel of the first pixel connected to the fourth gate line, among sub pixels of the second pixel, is sensed by the second reference voltage line, a sub pixel having a different color from the sub pixel of the first pixel connected to the fourth gate line and the sub pixel of the second pixel connected to the fourth gate line, among sub pixels of the third pixel, is sensed by the third reference voltage line, and a sub pixel having a different color from the sub pixel of the first pixel connected to the fourth gate line, the sub pixel of the second pixel connected to the fourth gate line, and the sub pixel of the third pixel connected to the fourth gate line, among sub pixels of the fourth pixel, is sensed by the fourth reference voltage line.

12. The sensing method according to claim 9, wherein each of the sub pixels includes:

a switching transistor, a driving transistor, a storage capacitor, a sensing transistor, and a light emitting diode; and wherein the sensing transistor outputs a voltage for sensing a threshold voltage and a mobility of the driving transistor to the N reference voltage lines.

13. The display device according to claim 1 wherein each of the sub pixels includes:

a switching transistor, a driving transistor, a storage capacitor, a sensing transistor, and a light emitting diode; and wherein the sensing transistor outputs a voltage for sensing a threshold voltage and a mobility of the driving transistor to the N reference voltage lines.

14. A display device, comprising:

a display panel in which a plurality of pixel units each including N−1 pixels, the pixel units including a first pixel, a second pixel, and a third pixel each pixel including a first sub pixel, a second sub pixel, at sub pixel, and a fourth sub pixel disposed sequentially in a row;

a data driver configured to supply a data voltage to the N−1 pixels via N data lines using a sensing result of the N−1 pixels via N−1 reference voltage lines; and a gate driver configured to supply a gate signal to the N−1 pixels via N−1 gate lines, wherein each of the N−1 pixels including N sub pixel each having a different color;

wherein each of the N data lines is branched into a N−1 sub data lines, wherein each of the N−1 sub data lines is connected to sub pixels having the same color in pixel unit, and wherein the first sub pixel and the second sub pixel of one pixel of the pixel unit and third sub pixel and the fourth sub pixel of adjacent pixel of the pixel unit disposed sequentially in a row are connected to same gate line.

15. The display device according claim 14, wherein each of the sub pixels includes:

a switching transistor, a driving transistor, a storage capacitor, a sensing transistor, and a light emitting diode; and wherein the sensing transistor outputs a voltage for sensing a threshold voltage and a mobility of the driving transistor to the N reference voltage lines.

16. A display device, comprising:

a display panel in which a plurality of pixel units each including N−1 pixels, the pixel units including a first pixel, a second pixel, and a third pixel, each pixel including a first sub pixel, a second sub pixel, a third sub pixel, and a fourth sub pixel disposed sequentially in a row;

a data driver configured to supply a data voltage to the N−1 pixels via N data lines using a sensing result of the N−1 pixels via N−1 reference voltage lines; and a gate driver configured to supply a gate signal to the N−1 pixels via N−1 gate lines, wherein each of the N−1 pixels including N sub pixel each having a different color:

wherein each of the N data lines is branched into a N−1 sub data lines, wherein each of the N−1 sub data lines is connected to sub pixels having the same color in pixel unit, wherein a first sub pixel of one pixel of the plurality of pixels and a fourth sub pixel of adjacent pixel of the plurality of pixels are connected to same gate line; and wherein a second sub pixel and third sub pixel of one pixel of the plurality of pixels are connected to same gate line.

* * * * *